United States Patent
Andreasson et al.

(10) Patent No.: US 12,282,653 B2
(45) Date of Patent: Apr. 22, 2025

(54) TOUCH APPARATUS WITH LOW LATENCY INTERACTIONS

(71) Applicant: FlatFrog Laboratories AB, Lund (SE)

(72) Inventors: Markus Andreasson, Lund (SE); Gunnar Weibull, Malmö (SE)

(73) Assignee: FLATFROG LABORATORIES AB, Lund (SE)

( * ) Notice: Subject to any disclaimer, the term of this patent is extended or adjusted under 35 U.S.C. 154(b) by 0 days.

(21) Appl. No.: 17/760,139

(22) PCT Filed: Feb. 5, 2021

(86) PCT No.: PCT/SE2021/050086
§ 371 (c)(1),
(2) Date: Aug. 4, 2022

(87) PCT Pub. No.: WO2021/158164
PCT Pub. Date: Aug. 12, 2021

(65) Prior Publication Data
US 2023/0082401 A1    Mar. 16, 2023

(30) Foreign Application Priority Data
Feb. 8, 2020 (SE) .................................. 2030041-4

(51) Int. Cl.
G06F 3/04883    (2022.01)
G06F 9/54    (2006.01)
(52) U.S. Cl.
CPC ............ *G06F 3/04883* (2013.01); *G06F 9/54* (2013.01)
(58) Field of Classification Search
None
See application file for complete search history.

(56) References Cited

U.S. PATENT DOCUMENTS 3,375,053 A    3/1968    Ward
3,440,426 A    4/1969    Bush
(Continued)

FOREIGN PATENT DOCUMENTS

AU    2008280952 A1    3/2009
AU    2014201966 A1    4/2014
(Continued)

OTHER PUBLICATIONS

International Search Report in International App. No. PCT/SE2021/050086 dated Feb. 26, 2021 in 5 pages.
(Continued)

*Primary Examiner* — Kavita Stanley
*Assistant Examiner* — David V Luu
(74) *Attorney, Agent, or Firm* — Knobbe, Martens, Olson & Bear, LLP

(57) ABSTRACT

An interactive device is described that is configured to: display an output of a remote device, wherein an output delay exists between the output being generated by the remote device and the output being displayed on the interactive device, generate an interaction data in dependence on an interaction with the interactive device at a location, transmit the interaction data to the remote device, display an updated output of the remote device, the updated output being generated by the remote device subsequent to receiving the interaction data, wherein the interactive device being further configured to: generate an interaction image of an area of the updated output of the remote device corresponding to the location of the interaction, determine an interaction indication in dependence on the interaction image, displaying an interaction indication on the interactive device at a location of one or more further interactions with the interactive device.

14 Claims, 6 Drawing Sheets

(56) References Cited

U.S. PATENT DOCUMENTS

| | | |
|---|---|---|
| 3,478,220 A | 11/1969 | Milroy |
| 3,553,680 A | 1/1971 | Cooreman |
| 3,673,327 A | 6/1972 | Johnson et al. |
| 4,129,384 A | 12/1978 | Walker et al. |
| 4,180,702 A | 12/1979 | Hartmann et al. |
| 4,209,255 A | 6/1980 | Heynau et al. |
| 4,213,707 A | 7/1980 | Evans, Jr. |
| 4,254,333 A | 3/1981 | Arne |
| 4,254,407 A | 3/1981 | Tipon |
| 4,294,543 A | 10/1981 | Apple et al. |
| 4,346,376 A | 8/1982 | Mallos |
| 4,420,261 A | 12/1983 | Barlow et al. |
| 4,459,476 A | 7/1984 | Weissmueller et al. |
| 4,484,179 A | 11/1984 | Kasday |
| 4,507,557 A | 3/1985 | Tsikos |
| 4,521,112 A | 6/1985 | Kuwabara et al. |
| 4,542,375 A | 9/1985 | Alles et al. |
| 4,550,250 A | 10/1985 | Mueller et al. |
| 4,593,191 A | 6/1986 | Alles |
| 4,673,918 A | 6/1987 | Adler et al. |
| 4,688,933 A | 8/1987 | Lapeyre |
| 4,688,993 A | 8/1987 | Ferris et al. |
| 4,692,809 A | 9/1987 | Beining et al. |
| 4,710,760 A | 12/1987 | Kasday |
| 4,736,191 A | 4/1988 | Matzke et al. |
| 4,737,626 A | 4/1988 | Hasegawa |
| 4,746,770 A | 5/1988 | McAvinney |
| 4,751,379 A | 6/1988 | Sasaki et al. |
| 4,752,655 A | 6/1988 | Tajiri et al. |
| 4,766,424 A | 8/1988 | Adler et al. |
| 4,772,763 A | 9/1988 | Garwin et al. |
| 4,782,328 A | 11/1988 | Denlinger |
| 4,812,833 A | 3/1989 | Shimauchi |
| 4,820,050 A | 4/1989 | Griffin |
| 4,837,430 A | 6/1989 | Hasegawa |
| 4,868,550 A | 9/1989 | Sasaki et al. |
| 4,868,912 A | 9/1989 | Doering |
| 4,891,829 A | 1/1990 | Deckman et al. |
| 4,916,308 A | 4/1990 | Meadows |
| 4,916,712 A | 4/1990 | Bender |
| 4,933,544 A | 6/1990 | Tamaru |
| 4,949,079 A | 8/1990 | Loebner |
| 4,986,662 A | 1/1991 | Bures |
| 4,988,983 A | 1/1991 | Wehrer |
| 4,994,677 A | 2/1991 | Graindorge |
| 5,065,185 A | 11/1991 | Powers et al. |
| 5,073,770 A | 12/1991 | Lowbner |
| 5,105,186 A | 4/1992 | May |
| 5,115,677 A | 5/1992 | Martin et al. |
| 5,155,813 A | 10/1992 | Donoghue et al. |
| 5,159,322 A | 10/1992 | Loebner |
| 5,162,783 A | 11/1992 | Moreno |
| 5,166,668 A | 11/1992 | Aoyagi |
| 5,175,030 A | 12/1992 | Lu et al. |
| 5,227,622 A | 7/1993 | Suzuki |
| 5,248,856 A | 9/1993 | Mallicoat |
| 5,254,407 A | 10/1993 | Sergerie et al. |
| 5,345,490 A | 9/1994 | Finnigan et al. |
| 5,383,022 A | 1/1995 | Beda |
| 5,414,413 A | 5/1995 | Tamaru et al. |
| 5,434,373 A | 7/1995 | Komaki |
| 5,483,261 A | 1/1996 | Yasutake |
| 5,484,966 A | 1/1996 | Segen |
| 5,499,098 A | 3/1996 | Ogawa |
| 5,502,568 A | 3/1996 | Ogawa et al. |
| 5,515,083 A | 5/1996 | Casebolt et al. |
| 5,525,764 A | 6/1996 | Junkins et al. |
| 5,526,422 A | 6/1996 | Keen |
| 5,539,514 A | 7/1996 | Shishido et al. |
| 5,543,591 A | 8/1996 | Gillespie et al. |
| 5,570,181 A | 10/1996 | Yasuo et al. |
| 5,572,251 A | 11/1996 | Ogawa |
| 5,577,501 A | 11/1996 | Flohr et al. |
| 5,600,105 A | 2/1997 | Fukuzaki et al. |
| 5,605,406 A | 2/1997 | Bowen |
| 5,608,550 A | 3/1997 | Epstein et al. |
| 5,672,852 A | 9/1997 | Fukuzaki et al. |
| 5,677,082 A | 10/1997 | Greinke et al. |
| 5,679,930 A | 10/1997 | Katsurahira |
| 5,686,942 A | 11/1997 | Ball |
| 5,688,933 A | 11/1997 | Evans et al. |
| 5,729,249 A | 3/1998 | Yasutake |
| 5,729,250 A | 3/1998 | Bishop et al. |
| 5,736,686 A | 4/1998 | Perret et al. |
| 5,740,224 A | 4/1998 | Mueller et al. |
| 5,746,423 A | 5/1998 | Arov |
| 5,764,223 A | 6/1998 | Chang et al. |
| 5,767,517 A | 6/1998 | Hawkins |
| 5,775,792 A | 7/1998 | Wiese |
| 5,808,606 A | 9/1998 | Kodama et al. |
| 5,945,980 A | 8/1999 | Moissev et al. |
| 5,945,981 A | 8/1999 | Paull et al. |
| 5,959,617 A | 9/1999 | Bird et al. |
| 6,031,524 A | 2/2000 | Kunert |
| 6,061,177 A | 5/2000 | Fujimoto |
| 6,067,079 A | 5/2000 | Shieh |
| 6,072,450 A | 6/2000 | Yamada et al. |
| 6,100,538 A | 8/2000 | Ogawa |
| 6,122,394 A | 9/2000 | Neukermans et al. |
| 6,130,663 A | 10/2000 | Null |
| 6,141,104 A | 10/2000 | Schulz et al. |
| 6,172,667 B1 | 1/2001 | Sayag |
| 6,175,999 B1 | 1/2001 | Sloan et al. |
| 6,227,667 B1 | 5/2001 | Halldorsson et al. |
| 6,229,529 B1 | 5/2001 | Yano et al. |
| 6,315,156 B1 | 11/2001 | Mahoney et al. |
| 6,333,735 B1 | 12/2001 | Anvekar |
| 6,340,967 B1 | 1/2002 | Maxted |
| 6,366,276 B1 | 4/2002 | Kunimatsu et al. |
| 6,380,732 B1 | 4/2002 | Gilboa |
| 6,380,740 B1 | 4/2002 | Laub |
| 6,390,370 B1 | 5/2002 | Plesko |
| 6,429,857 B1 | 8/2002 | Masters et al. |
| 6,452,996 B1 | 9/2002 | Hsieh |
| 6,476,797 B1 | 11/2002 | Kurihara et al. |
| 6,480,187 B1 | 11/2002 | Sano et al. |
| 6,492,633 B2 | 12/2002 | Nakazawa et al. |
| 6,495,832 B1 | 12/2002 | Kirby |
| 6,504,143 B2 | 1/2003 | Koops et al. |
| 6,504,530 B1 | 1/2003 | Wilson et al. |
| 6,524,749 B1 | 2/2003 | Kaneda et al. |
| 6,529,327 B1 | 3/2003 | Graindorge |
| 6,535,213 B1 | 3/2003 | Ogino et al. |
| 6,538,644 B1 | 3/2003 | Muraoka |
| 6,587,099 B2 | 7/2003 | Takekawa |
| 6,648,485 B1 | 11/2003 | Colgan et al. |
| 6,660,964 B1 | 12/2003 | Benderly |
| 6,664,498 B2 | 12/2003 | Forsman et al. |
| 6,664,952 B2 | 12/2003 | Iwamoto et al. |
| 6,677,934 B1 | 1/2004 | Blanchard |
| 6,690,363 B2 | 2/2004 | Newton |
| 6,692,807 B2 | 2/2004 | Bries et al. |
| 6,707,027 B2 | 3/2004 | Liess et al. |
| 6,710,767 B1 | 3/2004 | Hasegawa et al. |
| 6,738,051 B2 | 5/2004 | Boyd et al. |
| 6,748,098 B1 | 6/2004 | Rosenfeld |
| 6,784,948 B2 | 8/2004 | Kawashima et al. |
| 6,799,141 B1 | 9/2004 | Stoustrup et al. |
| 6,803,900 B1 | 10/2004 | Berkoff et al. |
| 6,806,871 B1 | 10/2004 | Yasue |
| 6,828,959 B2 | 12/2004 | Takekawa et al. |
| 6,911,646 B1 | 6/2005 | Weitekamp |
| 6,927,384 B2 | 8/2005 | Reime et al. |
| 6,940,286 B2 | 9/2005 | Wang et al. |
| 6,965,836 B2 | 11/2005 | Richardson |
| 6,972,401 B2 | 12/2005 | Akitt et al. |
| 6,972,753 B1 | 12/2005 | Kimura et al. |
| 6,985,137 B2 | 1/2006 | Kaikuranta |
| 7,042,444 B2 | 5/2006 | Cok |
| 7,084,859 B1 | 8/2006 | Pryor |
| 7,087,907 B1 | 8/2006 | Lalovic et al. |
| 7,117,157 B1 | 10/2006 | Taylor et al. |
| 7,133,031 B2 | 11/2006 | Wang et al. |
| 7,151,530 B2 | 12/2006 | Roeber et al. |

(56) References Cited

U.S. PATENT DOCUMENTS

| | | |
|---|---|---|
| 7,176,904 B2 | 2/2007 | Satoh |
| 7,199,932 B2 | 4/2007 | Sugiura |
| 7,359,041 B2 | 4/2008 | Xie et al. |
| 7,397,418 B1 | 7/2008 | Doerry et al. |
| 7,432,893 B2 | 10/2008 | Ma et al. |
| 7,435,940 B2 | 10/2008 | Eliasson et al. |
| 7,436,443 B2 | 10/2008 | Hirunuma et al. |
| 7,442,914 B2 | 10/2008 | Eliasson et al. |
| 7,465,914 B2 | 12/2008 | Eliasson et al. |
| 7,528,898 B2 | 5/2009 | Hashimoto |
| D602,498 S | 10/2009 | Arnell |
| 7,613,375 B2 | 11/2009 | Shimizu |
| 7,629,968 B2 | 12/2009 | Miller et al. |
| 7,646,379 B1 | 1/2010 | Drennan et al. |
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,712,041 B2 | 5/2010 | Toyama et al. |
| 7,729,056 B2 | 6/2010 | Hwang et al. |
| 7,812,826 B2 | 10/2010 | Ording et al. |
| 7,847,789 B2 | 12/2010 | Kolmykov-Zotov et al. |
| 7,855,716 B2 | 12/2010 | Mccreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,956,847 B2 | 6/2011 | Christie |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |
| 8,094,910 B2 | 1/2012 | Xu et al. |
| 8,139,046 B2 | 3/2012 | Kweon et al. |
| 8,149,211 B2 | 4/2012 | Hayakawa et al. |
| 8,149,221 B2 | 4/2012 | Newton |
| 8,154,418 B2 | 4/2012 | Peterson et al. |
| 8,184,108 B2 | 5/2012 | Smits |
| 8,194,036 B1 | 6/2012 | Braun et al. |
| 8,217,854 B2 | 7/2012 | Bhogal et al. |
| 8,218,154 B2 | 7/2012 | Oestergaard et al. |
| 8,274,495 B2 | 9/2012 | Lee |
| D669,497 S | 10/2012 | Lee et al. |
| 8,314,773 B2 | 11/2012 | Low et al. |
| 8,319,729 B2 | 11/2012 | Choi et al. |
| 8,325,158 B2 | 12/2012 | Yatsuda et al. |
| 8,339,379 B2 | 12/2012 | Goertz et al. |
| 8,345,023 B1 | 1/2013 | Drennan et al. |
| 8,350,827 B2 | 1/2013 | Chung et al. |
| D675,644 S | 2/2013 | Frost et al. |
| 8,384,010 B2 | 2/2013 | Hong et al. |
| 8,384,693 B2 | 2/2013 | Newton |
| 8,407,606 B1 | 3/2013 | Davidson et al. |
| 8,436,833 B2 | 5/2013 | King et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Christiansson et al. |
| 8,542,217 B2 | 9/2013 | Wassvik et al. |
| 8,553,014 B2 | 10/2013 | Holmgren et al. |
| 8,567,257 B2 | 10/2013 | Van et al. |
| 8,571,171 B2 | 10/2013 | Tischenko et al. |
| 8,581,884 B2 | 11/2013 | Fåhraeus et al. |
| 8,587,562 B2 | 11/2013 | Goertz et al. |
| 8,599,140 B2 | 12/2013 | Crockett et al. |
| 8,610,672 B2 | 12/2013 | Kun et al. |
| 8,624,858 B2 | 1/2014 | Fyke et al. |
| 8,674,963 B2 | 3/2014 | Cornish et al. |
| 8,676,007 B2 | 3/2014 | Holmgren et al. |
| 8,686,974 B2 | 4/2014 | Christiansson et al. |
| 8,692,807 B2 | 4/2014 | Foehraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,749,527 B2 | 6/2014 | Douxchamps et al. |
| 8,780,066 B2 | 7/2014 | Christiansson et al. |
| 8,830,181 B1 | 9/2014 | Clark et al. |
| 8,837,882 B2 | 9/2014 | Holmgren et al. |
| 8,860,696 B2 | 10/2014 | Wassvik et al. |
| 8,866,870 B1 | 10/2014 | Smith |
| 8,872,098 B2 | 10/2014 | Bergstrm et al. |
| 8,872,801 B2 | 10/2014 | Bergstrm et al. |
| D716,820 S | 11/2014 | Wood |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,896,575 B2 | 11/2014 | Goertz et al. |
| 8,902,196 B2 | 12/2014 | Goertz et al. |
| 8,913,035 B2 | 12/2014 | Lai et al. |
| 8,922,526 B2 | 12/2014 | Wang |
| 8,928,590 B1 | 1/2015 | El Dokor |
| 8,928,609 B2 | 1/2015 | Italia et al. |
| 8,963,886 B2 | 2/2015 | Wassvik |
| 8,982,084 B2 | 3/2015 | Christiansson et al. |
| 9,001,086 B1 | 4/2015 | Saini |
| 9,024,896 B2 | 5/2015 | Chen |
| 9,024,916 B2 | 5/2015 | Christiansson |
| 9,025,855 B1 | 5/2015 | Christoph et al. |
| 9,035,909 B2 | 5/2015 | Christiansson |
| 9,052,771 B2 | 6/2015 | Goertz et al. |
| 9,063,614 B2 | 6/2015 | Pettersson et al. |
| 9,063,617 B2 | 6/2015 | Eliasson et al. |
| 9,086,763 B2 | 7/2015 | Johansson et al. |
| 9,092,091 B2 | 7/2015 | Piot et al. |
| 9,128,250 B2 | 9/2015 | Charters et al. |
| 9,134,854 B2 | 9/2015 | Wassvik et al. |
| 9,137,891 B2 | 9/2015 | Gibbs et al. |
| 9,158,401 B2 | 10/2015 | Christiansson et al. |
| 9,158,415 B2 | 10/2015 | Song et al. |
| 9,158,416 B2 | 10/2015 | Eriksson et al. |
| 9,164,625 B2 | 10/2015 | Holmgren et al. |
| 9,195,344 B2 | 11/2015 | Goertz et al. |
| 9,201,520 B2 | 12/2015 | Benko et al. |
| 9,207,800 B1 | 12/2015 | Eriksson et al. |
| 9,213,443 B2 | 12/2015 | Goertz et al. |
| 9,213,445 B2 | 12/2015 | King et al. |
| 9,223,441 B1 | 12/2015 | Bohn |
| 9,274,645 B2 | 3/2016 | Christiansson et al. |
| 9,280,237 B2 | 3/2016 | Kukulj |
| 9,291,845 B2 | 3/2016 | Shin et al. |
| 9,292,132 B2 | 3/2016 | An et al. |
| 9,317,146 B1 | 4/2016 | Hufnagel |
| 9,317,168 B2 | 4/2016 | Christiansson et al. |
| 9,318,156 B2 | 4/2016 | Kanapathippillai et al. |
| 9,323,396 B2 | 4/2016 | Han et al. |
| 9,335,867 B2 | 5/2016 | Holmgren et al. |
| 9,366,565 B2 | 6/2016 | Krister |
| 9,366,802 B2 | 6/2016 | Lee et al. |
| 9,377,884 B2 | 6/2016 | Christiansson et al. |
| 9,389,730 B2 | 7/2016 | Goertz et al. |
| 9,389,732 B2 | 7/2016 | Craven-Bartle |
| 9,411,430 B2 | 8/2016 | Holmgren et al. |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| D768,674 S | 10/2016 | Hanover |
| 9,471,170 B2 | 10/2016 | Goertz et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,563,298 B2 | 2/2017 | Sakashita et al. |
| D782,516 S | 3/2017 | Hhne et al. |
| 9,588,619 B2 | 3/2017 | Christiansson et al. |
| 9,594,467 B2 | 3/2017 | Christiansson et al. |
| D783,042 S | 4/2017 | Kim et al. |
| 9,618,682 B2 | 4/2017 | Yoon et al. |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,645,679 B2 | 5/2017 | Eriksson et al. |
| 9,652,082 B1 | 5/2017 | Lin et al. |

(56) References Cited

U.S. PATENT DOCUMENTS

| | | |
|---|---|---|
| 9,671,900 B2 | 6/2017 | Piot et al. |
| 9,678,601 B2 | 6/2017 | Pettersson et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 9,720,499 B2 | 8/2017 | Han et al. |
| 9,741,184 B2 | 8/2017 | Iyer et al. |
| D798,893 S | 10/2017 | Anzures et al. |
| 9,785,287 B2 | 10/2017 | Bergstrom et al. |
| 9,811,163 B2 | 11/2017 | Eriksson et al. |
| 9,811,209 B2 | 11/2017 | Christiansson et al. |
| D807,388 S | 1/2018 | Butcher et al. |
| D808,416 S | 1/2018 | Anzures et al. |
| 9,857,916 B2 | 1/2018 | Bergstrm et al. |
| 9,857,917 B2 | 1/2018 | Wassvik et al. |
| 9,864,470 B2 | 1/2018 | Christiansson |
| 9,874,978 B2 | 1/2018 | Wall |
| 9,921,661 B2 | 3/2018 | Eriksson et al. |
| 9,927,921 B2 | 3/2018 | Lee |
| 9,983,626 B2 | 5/2018 | Cao et al. |
| 9,983,717 B2 | 5/2018 | Pacheco et al. |
| 9,996,196 B2 | 6/2018 | Christiansson et al. |
| 10,001,881 B2 | 6/2018 | Wallander et al. |
| 10,004,985 B2 | 6/2018 | Holmgren et al. |
| D824,412 S | 7/2018 | Anzures et al. |
| 10,013,107 B2 | 7/2018 | Christiansson et al. |
| 10,019,113 B2 | 7/2018 | Christiansson et al. |
| 10,024,741 B2 | 7/2018 | Povazay et al. |
| 10,031,623 B2 | 7/2018 | Christiansson et al. |
| 10,048,773 B2 | 8/2018 | Fahraeus et al. |
| 10,088,919 B2 | 10/2018 | Tamura |
| 10,088,957 B2 | 10/2018 | Johansson et al. |
| 10,126,882 B2 | 11/2018 | Wassvik |
| 10,126,897 B2 | 11/2018 | Kwon et al. |
| 10,139,854 B2 | 11/2018 | Krishnakumar et al. |
| 10,146,376 B2 | 12/2018 | Wassvik et al. |
| 10,151,866 B2 | 12/2018 | Craven-Bartle et al. |
| 10,152,176 B2 | 12/2018 | Wallander |
| 10,161,886 B2 | 12/2018 | Ohlsson et al. |
| D837,829 S | 1/2019 | Balles et al. |
| D838,280 S | 1/2019 | Coburn et al. |
| 10,168,835 B2 | 1/2019 | Wallander et al. |
| D842,312 S | 3/2019 | Na et al. |
| 10,261,639 B2 | 4/2019 | Lee et al. |
| 10,268,288 B1 | 4/2019 | Wang et al. |
| 10,268,319 B2 | 4/2019 | Wassvik et al. |
| 10,282,035 B2 | 5/2019 | Kocovski et al. |
| 10,317,200 B1 | 6/2019 | Han et al. |
| 10,318,041 B2 | 6/2019 | Björklund et al. |
| 10,318,074 B2 | 6/2019 | Klinghult et al. |
| 10,324,565 B2 | 6/2019 | Rosengren et al. |
| 10,324,566 B2 | 6/2019 | Christiansson |
| D852,842 S | 7/2019 | Hung et al. |
| 10,365,768 B2 | 7/2019 | Craven-Bartle et al. |
| 10,372,265 B2 | 8/2019 | Christiansson et al. |
| 10,397,638 B2 | 8/2019 | Kanematsu et al. |
| 10,401,546 B2 | 9/2019 | Craven-Bartle et al. |
| 10,417,219 B1 | 9/2019 | Yang et al. |
| 10,437,358 B2 | 10/2019 | Geaghan et al. |
| 10,437,389 B2 | 10/2019 | Skagmo et al. |
| 10,459,589 B2 | 10/2019 | Xu et al. |
| 10,459,590 B2 | 10/2019 | Lin et al. |
| 10,474,249 B2 | 11/2019 | Fahraeus et al. |
| 10,481,737 B2 | 11/2019 | Christiansson et al. |
| 10,496,227 B2 | 12/2019 | Wassvik et al. |
| 10,579,227 B1 | 3/2020 | Bura et al. |
| 10,606,414 B2 | 3/2020 | Christiansson et al. |
| 10,606,416 B2 | 3/2020 | Skagmo et al. |
| 10,642,386 B2 | 5/2020 | Makelainen et al. |
| 10,649,585 B1 | 5/2020 | Van et al. |
| 10,691,638 B1 | 6/2020 | Lyadvinsky et al. |
| D892,855 S | 8/2020 | Liu |
| 10,739,916 B2 | 8/2020 | Skagmo et al. |
| 10,761,657 B2 | 9/2020 | Christiansson et al. |
| 10,775,935 B2 | 9/2020 | Kocovski et al. |
| 10,775,937 B2 | 9/2020 | Christiansson et al. |
| 10,853,315 B1 | 12/2020 | Faibish et al. |
| 10,860,142 B1 | 12/2020 | Northcott et al. |
| 10,884,275 B2 | 1/2021 | Yang et al. |
| 10,884,553 B2 | 1/2021 | Weilbacher et al. |
| 10,892,303 B2 | 1/2021 | Li |
| 10,963,104 B2 | 3/2021 | Bergström et al. |
| 11,016,605 B2 | 5/2021 | Christiansson et al. |
| 11,029,783 B2 | 6/2021 | Wassvik et al. |
| 11,099,688 B2 | 8/2021 | Christiansson et al. |
| 11,106,312 B2 | 8/2021 | Christiansson et al. |
| 11,106,314 B2 | 8/2021 | Krishnakumar et al. |
| 11,119,565 B2 | 9/2021 | Avila et al. |
| 11,175,756 B2 | 11/2021 | Andersson et al. |
| 11,182,023 B2 | 11/2021 | Ohlsson et al. |
| 11,188,730 B1 | 11/2021 | Kwon et al. |
| 11,243,640 B2 | 2/2022 | Ancona et al. |
| 11,256,371 B2 | 2/2022 | Craven-Bartle et al. |
| 11,263,028 B2 * | 3/2022 | Momchilov ............ H04L 67/75 |
| 11,269,460 B2 | 3/2022 | Skagmo et al. |
| 11,281,335 B2 | 3/2022 | Kocovski et al. |
| 11,281,338 B2 | 3/2022 | Skagmo et al. |
| 11,301,089 B2 | 4/2022 | Christiansson et al. |
| 11,474,644 B2 | 10/2022 | Kocovski et al. |
| 11,567,610 B2 | 1/2023 | Bergström et al. |
| 11,579,731 B2 | 2/2023 | Kocovski et al. |
| 11,579,732 B2 | 2/2023 | Skagmo et al. |
| 11,650,699 B2 | 5/2023 | Bergström et al. |
| 11,740,741 B2 | 8/2023 | Bergström et al. |
| 11,868,568 B2 | 1/2024 | Kocovski et al. |
| 11,893,189 B2 | 2/2024 | Håkan |
| 11,909,033 B2 | 2/2024 | Tsuzuki et al. |
| 11,914,819 B2 | 2/2024 | Kocovski et al. |
| 11,943,563 B2 | 3/2024 | Wassvik et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2001/0055411 A1 | 12/2001 | Black |
| 2002/0085003 A1 | 7/2002 | Nagashima |
| 2002/0118177 A1 | 8/2002 | Newton |
| 2002/0130883 A1 | 9/2002 | Huang et al. |
| 2002/0158823 A1 | 10/2002 | Zavracky et al. |
| 2002/0158853 A1 | 10/2002 | Sugawara et al. |
| 2002/0175901 A1 | 11/2002 | Gettemy |
| 2003/0016450 A1 | 1/2003 | Bluemel et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0085882 A1 | 5/2003 | Lu |
| 2003/0095399 A1 | 5/2003 | Grenda et al. |
| 2003/0107748 A1 | 6/2003 | Lee |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0109664 A1 | 6/2004 | Ohtsuki et al. |
| 2004/0134772 A1 | 7/2004 | Cohen et al. |
| 2004/0174541 A1 | 9/2004 | Freifeld |
| 2004/0179001 A1 | 9/2004 | Morrison et al. |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252867 A1 | 12/2004 | Lan et al. |
| 2005/0005319 A1 | 1/2005 | Della-Cioppa et al. |
| 2005/0012714 A1 | 1/2005 | Russo et al. |
| 2005/0022130 A1 | 1/2005 | Fabritius |
| 2005/0024624 A1 | 2/2005 | Gruhlke et al. |
| 2005/0041013 A1 | 2/2005 | Tanaka |
| 2005/0053191 A1 | 3/2005 | Gohno et al. |
| 2005/0057522 A1 | 3/2005 | Godler |
| 2005/0057903 A1 | 3/2005 | Choi |
| 2005/0073508 A1 | 4/2005 | Pittel et al. |
| 2005/0083293 A1 | 4/2005 | Dixon |
| 2005/0092900 A1 | 5/2005 | Reime et al. |

(56) References Cited

U.S. PATENT DOCUMENTS

| | | |
|---|---|---|
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0168134 A1 | 8/2005 | Nishikawa |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0237317 A1 | 10/2005 | Cok |
| 2005/0248540 A1 | 11/2005 | Newton |
| 2005/0248848 A1 | 11/2005 | Whitehead et al. |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0007185 A1 | 1/2006 | Kobayashi |
| 2006/0008164 A1 | 1/2006 | Wu et al. |
| 2006/0013353 A1 | 1/2006 | Hein |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0066586 A1 | 3/2006 | Gally et al. |
| 2006/0098004 A1 | 5/2006 | Cok |
| 2006/0132454 A1 | 6/2006 | Chen et al. |
| 2006/0139340 A1 | 6/2006 | Geaghan |
| 2006/0144237 A1 | 7/2006 | Liang et al. |
| 2006/0158437 A1 | 7/2006 | Blythe et al. |
| 2006/0164443 A1 | 7/2006 | Kettle et al. |
| 2006/0170658 A1 | 8/2006 | Nakamura et al. |
| 2006/0182345 A1 | 8/2006 | Geidl et al. |
| 2006/0202974 A1 | 9/2006 | Thielman |
| 2006/0256092 A1 | 11/2006 | Lee |
| 2006/0279558 A1 | 12/2006 | Van et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0083575 A1 | 4/2007 | Leung et al. |
| 2007/0120833 A1 | 5/2007 | Yamaguchi et al. |
| 2007/0132710 A1 | 6/2007 | Tateuchi et al. |
| 2007/0146337 A1 | 6/2007 | Ording et al. |
| 2007/0165008 A1 | 7/2007 | Crockett |
| 2007/0176162 A1 | 8/2007 | Kang |
| 2007/0195404 A1 | 8/2007 | Iijima |
| 2007/0285406 A1 | 12/2007 | Kukulj et al. |
| 2007/0296688 A1 | 12/2007 | Nakamura et al. |
| 2008/0006766 A1 | 1/2008 | Oon et al. |
| 2008/0007541 A1 | 1/2008 | Eliasson et al. |
| 2008/0011944 A1 | 1/2008 | Chua et al. |
| 2008/0012835 A1 | 1/2008 | Rimon et al. |
| 2008/0036743 A1 | 2/2008 | Westerman et al. |
| 2008/0062150 A1 | 3/2008 | Lee |
| 2008/0068691 A1 | 3/2008 | Miyatake |
| 2008/0080811 A1 | 4/2008 | Deane |
| 2008/0115081 A1 | 5/2008 | Sankaravadivelu et al. |
| 2008/0122792 A1 | 5/2008 | Izadi et al. |
| 2008/0122803 A1 | 5/2008 | Izadi et al. |
| 2008/0130979 A1 | 6/2008 | Ren et al. |
| 2008/0133265 A1 | 6/2008 | Silkaitis et al. |
| 2008/0150846 A1 | 6/2008 | Chung |
| 2008/0150848 A1 | 6/2008 | Chung et al. |
| 2008/0150915 A1 | 6/2008 | Shibue et al. |
| 2008/0151126 A1 | 6/2008 | Yu |
| 2008/0158176 A1 | 7/2008 | Land et al. |
| 2008/0180404 A1 | 7/2008 | Han et al. |
| 2008/0189046 A1 | 8/2008 | Eliasson et al. |
| 2008/0192025 A1 | 8/2008 | Jaeger et al. |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0280952 A1 | 11/2008 | Giblin et al. |
| 2008/0284925 A1 | 11/2008 | Han |
| 2008/0285406 A1 | 11/2008 | Moro et al. |
| 2008/0291668 A1 | 11/2008 | Aylward et al. |
| 2008/0297482 A1 | 12/2008 | Weiss |
| 2008/0309626 A1 | 12/2008 | Westerman et al. |
| 2009/0000831 A1 | 1/2009 | Miller et al. |
| 2009/0002340 A1 | 1/2009 | Van Genechten |
| 2009/0006292 A1 | 1/2009 | Block |
| 2009/0013562 A1 | 1/2009 | Pelletier |
| 2009/0040786 A1 | 2/2009 | Mori |
| 2009/0058833 A1 | 3/2009 | Newton |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0100383 A1* | 4/2009 | Sunday ............... G06F 3/04883 715/863 |
| 2009/0115919 A1 | 5/2009 | Tanaka et al. |
| 2009/0127005 A1 | 5/2009 | Zachut et al. |
| 2009/0128499 A1 | 5/2009 | Izadi et al. |
| 2009/0128508 A1 | 5/2009 | Sohn et al. |
| 2009/0135162 A1 | 5/2009 | Van et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0174679 A1 | 7/2009 | Westerman |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0209420 A1 | 8/2009 | Kalgutkar et al. |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0254869 A1 | 10/2009 | Ludwig et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273795 A1 | 11/2009 | Bacher et al. |
| 2009/0278795 A1 | 11/2009 | Hansen et al. |
| 2009/0278816 A1 | 11/2009 | Colson |
| 2009/0278913 A1 | 11/2009 | Rosenfeld et al. |
| 2009/0295752 A1 | 12/2009 | Liu et al. |
| 2010/0007331 A1 | 1/2010 | Hawkins et al. |
| 2010/0014024 A1 | 1/2010 | Tatsumi et al. |
| 2010/0026667 A1 | 2/2010 | Bernstein |
| 2010/0033444 A1 | 2/2010 | Kobayashi |
| 2010/0038545 A1 | 2/2010 | Cavallucci et al. |
| 2010/0045629 A1 | 2/2010 | Newton |
| 2010/0045634 A1 | 2/2010 | Su et al. |
| 2010/0057235 A1 | 3/2010 | Wang et al. |
| 2010/0059295 A1 | 3/2010 | Hotelling et al. |
| 2010/0060896 A1 | 3/2010 | Van et al. |
| 2010/0066016 A1 | 3/2010 | Van et al. |
| 2010/0066704 A1 | 3/2010 | Kasai |
| 2010/0073318 A1 | 3/2010 | Hu et al. |
| 2010/0073327 A1 | 3/2010 | Mau et al. |
| 2010/0079407 A1 | 4/2010 | Suggs |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0103133 A1 | 4/2010 | Park et al. |
| 2010/0125438 A1 | 5/2010 | Audet |
| 2010/0127975 A1 | 5/2010 | Jensen |
| 2010/0128985 A1 | 5/2010 | El-Sana et al. |
| 2010/0130257 A1 | 5/2010 | Jang |
| 2010/0130280 A1 | 5/2010 | Arezina et al. |
| 2010/0134435 A1 | 6/2010 | Kimura et al. |
| 2010/0141604 A1 | 6/2010 | Cai et al. |
| 2010/0142823 A1 | 6/2010 | Wang et al. |
| 2010/0166276 A1 | 7/2010 | Dube et al. |
| 2010/0176732 A1 | 7/2010 | Schenk et al. |
| 2010/0187422 A1 | 7/2010 | Kothari et al. |

(56) References Cited

U.S. PATENT DOCUMENTS

| | | |
|---|---|---|
| 2010/0189376 A1 | 7/2010 | Bertram et al. |
| 2010/0195804 A1 | 8/2010 | Dafni et al. |
| 2010/0207874 A1 | 8/2010 | Yuxin et al. |
| 2010/0229091 A1 | 9/2010 | Homma et al. |
| 2010/0238139 A1 | 9/2010 | Goertz et al. |
| 2010/0238686 A1 | 9/2010 | Weber et al. |
| 2010/0245292 A1 | 9/2010 | Wu |
| 2010/0253645 A1 | 10/2010 | Bolender |
| 2010/0259939 A1 | 10/2010 | Chen et al. |
| 2010/0265170 A1 | 10/2010 | Norieda |
| 2010/0277431 A1 | 11/2010 | Klinghult |
| 2010/0277436 A1 | 11/2010 | Feng et al. |
| 2010/0277728 A1 | 11/2010 | Imura |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302209 A1 | 12/2010 | Large |
| 2010/0302210 A1 | 12/2010 | Han et al. |
| 2010/0302240 A1 | 12/2010 | Lettvin |
| 2010/0309139 A1 | 12/2010 | Ng |
| 2010/0315379 A1 | 12/2010 | Allard et al. |
| 2010/0321328 A1 | 12/2010 | Chang et al. |
| 2010/0321341 A1 | 12/2010 | Cho et al. |
| 2010/0322550 A1 | 12/2010 | Trott |
| 2010/0325547 A1 | 12/2010 | Keng et al. |
| 2010/0328265 A1 | 12/2010 | Hotelling et al. |
| 2011/0007021 A1 | 1/2011 | Bernstein et al. |
| 2011/0037735 A1 | 2/2011 | Land et al. |
| 2011/0043490 A1 | 2/2011 | Powell et al. |
| 2011/0049388 A1 | 3/2011 | Delaney et al. |
| 2011/0050576 A1 | 3/2011 | Forutanpour et al. |
| 2011/0051394 A1 | 3/2011 | Bailey |
| 2011/0057102 A1 | 3/2011 | Yao |
| 2011/0065424 A1 | 3/2011 | Estevez et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0080361 A1 | 4/2011 | Miller et al. |
| 2011/0084939 A1 | 4/2011 | Gepner et al. |
| 2011/0096293 A1 | 4/2011 | Hirose et al. |
| 2011/0102320 A1 | 5/2011 | Hauke et al. |
| 2011/0102538 A1 | 5/2011 | Tan |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122094 A1 | 5/2011 | Tsang et al. |
| 2011/0134079 A1 | 6/2011 | Stark |
| 2011/0140106 A1 | 6/2011 | Forbes |
| 2011/0141062 A1 | 6/2011 | Yu et al. |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0169756 A1 | 7/2011 | Ogawa et al. |
| 2011/0199297 A1 | 8/2011 | Antonyuk et al. |
| 2011/0205186 A1 | 8/2011 | Newton et al. |
| 2011/0205189 A1 | 8/2011 | Newton |
| 2011/0205750 A1 | 8/2011 | Krijn et al. |
| 2011/0220794 A1 | 9/2011 | Censor et al. |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0234537 A1 | 9/2011 | Kim et al. |
| 2011/0254864 A1 | 10/2011 | Tsuchikawa et al. |
| 2011/0255305 A1 | 10/2011 | Chen et al. |
| 2011/0260829 A1 | 10/2011 | Lee |
| 2011/0266423 A1 | 11/2011 | Koeppe et al. |
| 2011/0267264 A1 | 11/2011 | McCarthy et al. |
| 2011/0267296 A1 | 11/2011 | Noguchi et al. |
| 2011/0287317 A1 | 11/2011 | Nakanishi |
| 2011/0291944 A1 | 12/2011 | Simmons et al. |
| 2011/0291988 A1 | 12/2011 | Bamji et al. |
| 2011/0298743 A1 | 12/2011 | Machida et al. |
| 2011/0304577 A1 | 12/2011 | Brown et al. |
| 2011/0309325 A1 | 12/2011 | Park et al. |
| 2011/0310045 A1 | 12/2011 | Toda et al. |
| 2011/0316005 A1 | 12/2011 | Murao et al. |
| 2012/0007835 A1 | 1/2012 | Chang et al. |
| 2012/0017182 A1 | 1/2012 | Bau |
| 2012/0019448 A1 | 1/2012 | Pitkanen et al. |
| 2012/0026408 A1 | 2/2012 | Lee et al. |
| 2012/0038593 A1 | 2/2012 | Roenkae et al. |
| 2012/0044572 A1 | 2/2012 | Simmonds et al. |
| 2012/0045170 A1 | 2/2012 | Shibata et al. |
| 2012/0050336 A1 | 3/2012 | Nave et al. |
| 2012/0056081 A1 | 3/2012 | Kozodoy |
| 2012/0056807 A1 | 3/2012 | Chapman et al. |
| 2012/0056814 A1 | 3/2012 | Sudo |
| 2012/0062474 A1 | 3/2012 | Weishaupt et al. |
| 2012/0062489 A1 | 3/2012 | Andersson et al. |
| 2012/0062492 A1 | 3/2012 | Katoh |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0091912 A1 | 4/2012 | Brown |
| 2012/0096383 A1 | 4/2012 | Sakamoto et al. |
| 2012/0098733 A1 | 4/2012 | Masuda et al. |
| 2012/0110447 A1 | 5/2012 | Chen |
| 2012/0131490 A1 | 5/2012 | Lin et al. |
| 2012/0141001 A1 | 6/2012 | Zhang et al. |
| 2012/0146930 A1 | 6/2012 | Lee |
| 2012/0146950 A1 | 6/2012 | Park et al. |
| 2012/0146957 A1 | 6/2012 | Dunagan |
| 2012/0154339 A1 | 6/2012 | Land et al. |
| 2012/0170056 A1 | 7/2012 | Jakobsen et al. |
| 2012/0173343 A1 | 7/2012 | Koning |
| 2012/0176343 A1 | 7/2012 | Holmgren et al. |
| 2012/0181419 A1 | 7/2012 | Momtahan |
| 2012/0182266 A1 | 7/2012 | Han |
| 2012/0188205 A1 | 7/2012 | Jansson et al. |
| 2012/0188206 A1 | 7/2012 | Sparf et al. |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0212457 A1 | 8/2012 | Drumm |
| 2012/0217882 A1 | 8/2012 | Wong et al. |
| 2012/0218200 A1 | 8/2012 | Glazer et al. |
| 2012/0218229 A1 | 8/2012 | Drumm |
| 2012/0221715 A1 | 8/2012 | Hamada |
| 2012/0235892 A1 | 9/2012 | Narendra et al. |
| 2012/0235955 A1 | 9/2012 | Ng et al. |
| 2012/0242622 A1 | 9/2012 | Tseng et al. |
| 2012/0249477 A1 | 10/2012 | Popovich et al. |
| 2012/0249478 A1 | 10/2012 | Chang et al. |
| 2012/0249485 A1 | 10/2012 | Ye et al. |
| 2012/0256882 A1 | 10/2012 | Christiansson et al. |
| 2012/0257004 A1 | 10/2012 | Smith et al. |
| 2012/0262407 A1 | 10/2012 | Hinckley et al. |
| 2012/0268427 A1 | 10/2012 | Slobodin |
| 2012/0274559 A1 | 11/2012 | Mathai et al. |
| 2012/0274583 A1 | 11/2012 | Haggerty |
| 2012/0299852 A1 | 11/2012 | Hsu et al. |
| 2012/0313865 A1 | 12/2012 | Pearce |
| 2013/0002536 A1 | 1/2013 | Yoshida et al. |
| 2013/0007579 A1 | 1/2013 | Dancy et al. |
| 2013/0016059 A1 | 1/2013 | Lowles et al. |
| 2013/0021302 A1 | 1/2013 | Drumm |
| 2013/0027404 A1 | 1/2013 | Sarnoff |
| 2013/0050141 A1 | 2/2013 | Park et al. |
| 2013/0055080 A1 | 2/2013 | Komer et al. |
| 2013/0055143 A1 | 2/2013 | Martin et al. |
| 2013/0076697 A1 | 3/2013 | Goertz et al. |
| 2013/0082980 A1 | 4/2013 | Gruhlke et al. |
| 2013/0093838 A1 | 4/2013 | Tan et al. |
| 2013/0106709 A1 | 5/2013 | Simmons |
| 2013/0107569 A1 | 5/2013 | Suganuma |
| 2013/0113715 A1 | 5/2013 | Grant et al. |
| 2013/0120274 A1 | 5/2013 | Ha et al. |
| 2013/0120320 A1 | 5/2013 | Liu et al. |
| 2013/0120324 A1 | 5/2013 | Diverdi et al. |
| 2013/0125016 A1 | 5/2013 | Pallakoff et al. |
| 2013/0127765 A1 | 5/2013 | Behdasht et al. |

(56) References Cited

U.S. PATENT DOCUMENTS

| | | |
|---|---|---|
| 2013/0135259 A1 | 5/2013 | King et al. |
| 2013/0136304 A1 | 5/2013 | Anabuki et al. |
| 2013/0141388 A1 | 6/2013 | Ludwig et al. |
| 2013/0141397 A1 | 6/2013 | Dunagan |
| 2013/0155655 A1 | 6/2013 | Lee et al. |
| 2013/0155723 A1 | 6/2013 | Coleman |
| 2013/0158504 A1 | 6/2013 | Ruchti et al. |
| 2013/0162588 A1 | 6/2013 | Wen |
| 2013/0181896 A1 | 7/2013 | Gruhlke et al. |
| 2013/0181908 A1 | 7/2013 | Santiago et al. |
| 2013/0181953 A1 | 7/2013 | Hinckley et al. |
| 2013/0187957 A1 | 7/2013 | Andersson et al. |
| 2013/0201142 A1 | 8/2013 | Suarez Rovere |
| 2013/0205963 A1 | 8/2013 | Prochello et al. |
| 2013/0208506 A1 | 8/2013 | Ye et al. |
| 2013/0222344 A1 | 8/2013 | Lu et al. |
| 2013/0222346 A1 | 8/2013 | Chen et al. |
| 2013/0229357 A1 | 9/2013 | Powell et al. |
| 2013/0234991 A1 | 9/2013 | Sparf |
| 2013/0241886 A1 | 9/2013 | Eriksson et al. |
| 2013/0241887 A1 | 9/2013 | Sharma |
| 2013/0250354 A1 | 9/2013 | Kato et al. |
| 2013/0254314 A1 | 9/2013 | Chow |
| 2013/0257793 A1 | 10/2013 | Zeliff et al. |
| 2013/0257810 A1 | 10/2013 | Niu et al. |
| 2013/0263042 A1 | 10/2013 | Buening |
| 2013/0263240 A1 | 10/2013 | Moskovitch |
| 2013/0269867 A1 | 10/2013 | Trott |
| 2013/0271487 A1 | 10/2013 | Lincoln |
| 2013/0275082 A1 | 10/2013 | Follmer et al. |
| 2013/0279190 A1 | 10/2013 | Huang |
| 2013/0285920 A1 | 10/2013 | Colley |
| 2013/0285977 A1 | 10/2013 | Baharav et al. |
| 2013/0300714 A1 | 11/2013 | Goh et al. |
| 2013/0307795 A1 | 11/2013 | Suarez Rovere |
| 2013/0307796 A1 | 11/2013 | Liu et al. |
| 2013/0321740 A1 | 12/2013 | An et al. |
| 2013/0328790 A1 | 12/2013 | Liu et al. |
| 2014/0015803 A1 | 1/2014 | Drumm |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0032735 A1 | 1/2014 | Kapoor |
| 2014/0035836 A1 | 2/2014 | Cui et al. |
| 2014/0036203 A1 | 2/2014 | Guillou et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0104190 A1 | 4/2014 | Davidson |
| 2014/0104195 A1 | 4/2014 | Davidson |
| 2014/0109219 A1 | 4/2014 | Rohrweck et al. |
| 2014/0111416 A1 | 4/2014 | Sugiura |
| 2014/0111478 A1 | 4/2014 | Lin et al. |
| 2014/0111480 A1 | 4/2014 | Kim et al. |
| 2014/0118295 A1 | 5/2014 | Motoi |
| 2014/0139467 A1 | 5/2014 | Ghosh et al. |
| 2014/0149880 A1* | 5/2014 | Farouki .............. G06F 3/1454 715/748 |
| 2014/0160762 A1 | 6/2014 | Dudik et al. |
| 2014/0168153 A1 | 6/2014 | Deichmann et al. |
| 2014/0192023 A1 | 7/2014 | Hoffman |
| 2014/0204036 A1 | 7/2014 | Schillings et al. |
| 2014/0210793 A1 | 7/2014 | Eriksson et al. |
| 2014/0218467 A1 | 8/2014 | You et al. |
| 2014/0225868 A1 | 8/2014 | Huang et al. |
| 2014/0226084 A1 | 8/2014 | Utukuri et al. |
| 2014/0226266 A1 | 8/2014 | Kang et al. |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253514 A1 | 9/2014 | Omura et al. |
| 2014/0253520 A1 | 9/2014 | Cueto et al. |
| 2014/0259029 A1 | 9/2014 | Choi et al. |
| 2014/0267147 A1 | 9/2014 | Buelow et al. |
| 2014/0292690 A1 | 10/2014 | Sugihara |
| 2014/0292699 A1 | 10/2014 | Ando |
| 2014/0300572 A1 | 10/2014 | Ohlsson et al. |
| 2014/0324953 A1 | 10/2014 | Seo et al. |
| 2014/0334767 A1 | 11/2014 | Lim et al. |
| 2014/0362046 A1 | 12/2014 | Yoshida |
| 2014/0362053 A1 | 12/2014 | Holmgren et al. |
| 2014/0362404 A1 | 12/2014 | Miyasaka |
| 2014/0367873 A1 | 12/2014 | Yang et al. |
| 2014/0380193 A1 | 12/2014 | Coplen et al. |
| 2015/0002386 A1 | 1/2015 | Mankowski et al. |
| 2015/0002470 A1 | 1/2015 | Zhu et al. |
| 2015/0009687 A1 | 1/2015 | Lin |
| 2015/0015497 A1 | 1/2015 | Leigh |
| 2015/0026630 A1 | 1/2015 | Bullock |
| 2015/0035774 A1 | 2/2015 | Christiansson et al. |
| 2015/0035803 A1 | 2/2015 | Wassvik et al. |
| 2015/0054791 A1 | 2/2015 | Omura |
| 2015/0062021 A1 | 3/2015 | Skaljak et al. |
| 2015/0062085 A1 | 3/2015 | Lu et al. |
| 2015/0070327 A1 | 3/2015 | Hsieh et al. |
| 2015/0091832 A1 | 4/2015 | Mizunuma et al. |
| 2015/0092233 A1 | 4/2015 | Park et al. |
| 2015/0103013 A9 | 4/2015 | Huang |
| 2015/0103051 A1 | 4/2015 | Wyrwas et al. |
| 2015/0109403 A1 | 4/2015 | Krishnan et al. |
| 2015/0121691 A1 | 5/2015 | Wang |
| 2015/0131010 A1 | 5/2015 | Sugiyama |
| 2015/0138161 A1 | 5/2015 | Wassvik |
| 2015/0154291 A1 | 6/2015 | Shepherd et al. |
| 2015/0160851 A1 | 6/2015 | Michihata et al. |
| 2015/0169948 A1 | 6/2015 | Motoi |
| 2015/0193141 A1 | 7/2015 | Goldsmith et al. |
| 2015/0193585 A1 | 7/2015 | Sunna |
| 2015/0194668 A1 | 7/2015 | Ueda et al. |
| 2015/0199071 A1 | 7/2015 | Hou |
| 2015/0205439 A1 | 7/2015 | Xu et al. |
| 2015/0212607 A1 | 7/2015 | Miller et al. |
| 2015/0215450 A1 | 7/2015 | Seo et al. |
| 2015/0227261 A1 | 8/2015 | Huang et al. |
| 2015/0242055 A1 | 8/2015 | Wallander |
| 2015/0253568 A1 | 9/2015 | Kobayashi |
| 2015/0256658 A1 | 9/2015 | Shin et al. |
| 2015/0261323 A1 | 9/2015 | Cui et al. |
| 2015/0261375 A1 | 9/2015 | Leigh et al. |
| 2015/0271481 A1 | 9/2015 | Guthrie et al. |
| 2015/0277636 A1 | 10/2015 | Holmgren et al. |
| 2015/0277663 A1 | 10/2015 | Goertz et al. |
| 2015/0286698 A1 | 10/2015 | Gagnier et al. |
| 2015/0286810 A1 | 10/2015 | Lebert |
| 2015/0288327 A1 | 10/2015 | Cherukupalli et al. |
| 2015/0293600 A1 | 10/2015 | Sears |
| 2015/0302026 A1 | 10/2015 | Nam et al. |
| 2015/0309662 A1 | 10/2015 | Wyrwas et al. |
| 2015/0309765 A1 | 10/2015 | Nagahara |
| 2015/0324028 A1 | 11/2015 | Wassvik et al. |
| 2015/0325848 A1 | 11/2015 | Yamashita et al. |
| 2015/0331461 A1 | 11/2015 | Delano et al. |
| 2015/0331545 A1 | 11/2015 | Wassvik et al. |
| 2015/0332655 A1 | 11/2015 | Krus et al. |
| 2015/0334138 A1 | 11/2015 | Conklin et al. |
| 2015/0334139 A1 | 11/2015 | Conklin et al. |
| 2015/0339000 A1 | 11/2015 | Lee et al. |
| 2015/0346856 A1 | 12/2015 | Wassvik |
| 2015/0363041 A1 | 12/2015 | Zeliff et al. |
| 2015/0363042 A1 | 12/2015 | Krus et al. |
| 2015/0373864 A1 | 12/2015 | Jung |
| 2016/0004898 A1 | 1/2016 | Holz |
| 2016/0021833 A1 | 1/2016 | Nishimura et al. |
| 2016/0026297 A1 | 1/2016 | Shinkai et al. |
| 2016/0034109 A1 | 2/2016 | Cho et al. |
| 2016/0041629 A1 | 2/2016 | Rao et al. |
| 2016/0050263 A1 | 2/2016 | Hwang et al. |
| 2016/0050746 A1 | 2/2016 | Wassvik et al. |
| 2016/0056471 A1 | 2/2016 | Sugimori et al. |
| 2016/0062549 A1 | 3/2016 | Drumm et al. |
| 2016/0065633 A1 | 3/2016 | Kawakubo |

(56) References Cited

U.S. PATENT DOCUMENTS

| | | |
|---|---|---|
| 2016/0070416 A1 | 3/2016 | Wassvik |
| 2016/0077616 A1 | 3/2016 | Durojaiye et al. |
| 2016/0092021 A1 | 3/2016 | Tu et al. |
| 2016/0098148 A1 | 4/2016 | Gandra et al. |
| 2016/0098152 A1 | 4/2016 | Drumm et al. |
| 2016/0117019 A1 | 4/2016 | Takeda |
| 2016/0124546 A1 | 5/2016 | Chen et al. |
| 2016/0147375 A1 | 5/2016 | Bok et al. |
| 2016/0154532 A1 | 6/2016 | Campbell |
| 2016/0179261 A1 | 6/2016 | Drumm |
| 2016/0195975 A1 | 7/2016 | Baum et al. |
| 2016/0202801 A1 | 7/2016 | Odagiri et al. |
| 2016/0202841 A1 | 7/2016 | Christiansson et al. |
| 2016/0209886 A1 | 7/2016 | Suh et al. |
| 2016/0210306 A1 | 7/2016 | Kumarasamy et al. |
| 2016/0216844 A1 | 7/2016 | Bergström |
| 2016/0227381 A1 | 8/2016 | Bargetzi et al. |
| 2016/0231833 A1 | 8/2016 | Gu et al. |
| 2016/0239153 A1 | 8/2016 | Holmgren et al. |
| 2016/0246390 A1 | 8/2016 | Lukanc et al. |
| 2016/0253568 A1 | 9/2016 | Idzik et al. |
| 2016/0255713 A1 | 9/2016 | Kim et al. |
| 2016/0269329 A1 | 9/2016 | Willis |
| 2016/0295711 A1 | 10/2016 | Ryu et al. |
| 2016/0299583 A1 | 10/2016 | Watanabe |
| 2016/0306501 A1 | 10/2016 | Drumm et al. |
| 2016/0328090 A1 | 11/2016 | Klinghult |
| 2016/0342282 A1 | 11/2016 | Wassvik |
| 2017/0031516 A1 | 2/2017 | Sugiyama et al. |
| 2017/0075476 A1 | 3/2017 | Kwon et al. |
| 2017/0075484 A1 | 3/2017 | Kali et al. |
| 2017/0075494 A1 | 3/2017 | Kwon et al. |
| 2017/0083164 A1 | 3/2017 | Sheng et al. |
| 2017/0090598 A1 | 3/2017 | Morrison et al. |
| 2017/0094224 A1 | 3/2017 | Hasegawa et al. |
| 2017/0115823 A1 | 4/2017 | Huang et al. |
| 2017/0123257 A1 | 5/2017 | Zhao |
| 2017/0131846 A1 | 5/2017 | Huitema |
| 2017/0147105 A1 | 5/2017 | Kwon et al. |
| 2017/0153763 A1 | 6/2017 | Vavra et al. |
| 2017/0160871 A1 | 6/2017 | Drumm |
| 2017/0185186 A1 | 6/2017 | Liu |
| 2017/0185230 A1 | 6/2017 | Wallander et al. |
| 2017/0185269 A1 | 6/2017 | Anttila et al. |
| 2017/0192493 A1 | 7/2017 | Ofek et al. |
| 2017/0192596 A1 | 7/2017 | Lee et al. |
| 2017/0220204 A1 | 8/2017 | Huang et al. |
| 2017/0235537 A1 | 8/2017 | Liu et al. |
| 2017/0237871 A1 | 8/2017 | Fan |
| 2017/0242579 A1* | 8/2017 | Poon ................ G06N 5/022 |
| 2017/0249030 A1 | 8/2017 | Park et al. |
| 2017/0255337 A1 | 9/2017 | Drumm |
| 2017/0264865 A1 | 9/2017 | Huangfu |
| 2017/0277355 A1 | 9/2017 | Kang |
| 2017/0285789 A1 | 10/2017 | Barel |
| 2017/0318115 A1 | 11/2017 | Peng et al. |
| 2017/0336891 A1 | 11/2017 | Rosenberg et al. |
| 2018/0049014 A1 | 2/2018 | Patil et al. |
| 2018/0062158 A1 | 3/2018 | Kim et al. |
| 2018/0074654 A1 | 3/2018 | Tanaka et al. |
| 2018/0107373 A1 | 4/2018 | Cheng |
| 2018/0113569 A1 | 4/2018 | Pommier et al. |
| 2018/0129311 A1 | 5/2018 | Westhues et al. |
| 2018/0136787 A1 | 5/2018 | Echols et al. |
| 2018/0136788 A1 | 5/2018 | He et al. |
| 2018/0149792 A1 | 5/2018 | Lee et al. |
| 2018/0168153 A1 | 6/2018 | Chen et al. |
| 2018/0203557 A1 | 7/2018 | Kim |
| 2018/0204877 A1 | 7/2018 | Jalili et al. |
| 2018/0205989 A1 | 7/2018 | Srinivasan et al. |
| 2018/0225006 A1 | 8/2018 | Wall |
| 2018/0235017 A1 | 8/2018 | Sakamoto |
| 2018/0253187 A1 | 9/2018 | Christiansson et al. |
| 2018/0275830 A1 | 9/2018 | Christiansson et al. |
| 2018/0275836 A1 | 9/2018 | Hermans et al. |
| 2018/0279454 A1 | 9/2018 | Takeshita et al. |
| 2018/0293436 A1 | 10/2018 | Jeon et al. |
| 2018/0314206 A1 | 11/2018 | Lee et al. |
| 2018/0349014 A1 | 12/2018 | Samuel et al. |
| 2019/0004668 A1 | 1/2019 | Jeong et al. |
| 2019/0012027 A1 | 1/2019 | Park et al. |
| 2019/0025977 A1 | 1/2019 | Christiansson et al. |
| 2019/0050074 A1 | 2/2019 | Kocovski |
| 2019/0065030 A1 | 2/2019 | Kang et al. |
| 2019/0079638 A1 | 3/2019 | Kocovski et al. |
| 2019/0107923 A1 | 4/2019 | Drumm |
| 2019/0146630 A1 | 5/2019 | Chen et al. |
| 2019/0155495 A1 | 5/2019 | Klein et al. |
| 2019/0196660 A1 | 6/2019 | Skagmo et al. |
| 2019/0227670 A1 | 7/2019 | O'Cleirigh et al. |
| 2019/0235665 A1 | 8/2019 | Kim et al. |
| 2019/0235701 A1 | 8/2019 | Han et al. |
| 2019/0250755 A1 | 8/2019 | Liu et al. |
| 2019/0250769 A1 | 8/2019 | Wallander |
| 2019/0258353 A1 | 8/2019 | Drumm et al. |
| 2019/0265941 A1 | 8/2019 | Baba |
| 2019/0272052 A1 | 9/2019 | Wallander et al. |
| 2019/0324570 A1 | 10/2019 | Kolundzija et al. |
| 2019/0377431 A1 | 12/2019 | Drumm |
| 2019/0377435 A1 | 12/2019 | Piot et al. |
| 2020/0006761 A1 | 1/2020 | Fujino et al. |
| 2020/0012359 A1 | 1/2020 | Jakobson et al. |
| 2020/0012408 A1 | 1/2020 | Drumm et al. |
| 2020/0064937 A1 | 2/2020 | Wassvik et al. |
| 2020/0073509 A1 | 3/2020 | Shih et al. |
| 2020/0096854 A1 | 3/2020 | Schiavoni et al. |
| 2020/0098147 A1 | 3/2020 | Ha et al. |
| 2020/0125189 A1 | 4/2020 | Kim et al. |
| 2020/0159382 A1 | 5/2020 | Drumm |
| 2020/0167033 A1 | 5/2020 | Kim et al. |
| 2020/0173050 A1 | 6/2020 | Curran et al. |
| 2020/0174644 A1 | 6/2020 | Weibull et al. |
| 2020/0177742 A1* | 6/2020 | Homma ................ H04L 67/141 |
| 2020/0249777 A1 | 8/2020 | Hou et al. |
| 2020/0293136 A1 | 9/2020 | Jakobson et al. |
| 2020/0310621 A1 | 10/2020 | Piot et al. |
| 2020/0341587 A1 | 10/2020 | Drumm |
| 2020/0348473 A1 | 11/2020 | Drumm |
| 2020/0348817 A1 | 11/2020 | Ohlsson et al. |
| 2020/0387237 A1 | 12/2020 | Drumm |
| 2021/0026587 A1 | 1/2021 | Christiansson et al. |
| 2021/0041970 A1 | 2/2021 | Bergstrm et al. |
| 2021/0081071 A1 | 3/2021 | Koh et al. |
| 2021/0089164 A1 | 3/2021 | Christiansson et al. |
| 2021/0096604 A1 | 4/2021 | Curran et al. |
| 2021/0255662 A1 | 8/2021 | Svensson et al. |
| 2022/0035481 A1 | 2/2022 | Bergstrom et al. |
| 2022/0100313 A1 | 3/2022 | Holmgren |
| 2022/0221955 A1 | 7/2022 | Bergström et al. |
| 2022/0413652 A1 | 12/2022 | Andersson et al. |
| 2023/0009306 A1 | 1/2023 | Andreasson |
| 2023/0057020 A1 | 2/2023 | Wassvik |
| 2023/0168775 A1 | 6/2023 | Skagmo et al. |
| 2023/0229266 A1 | 7/2023 | Bergstrom et al. |
| 2023/0359309 A1 | 11/2023 | Bergstrom et al. |
| 2023/0393692 A1 | 12/2023 | Krus |
| 2023/0400948 A1 | 12/2023 | Bergström et al. |
| 2024/0004501 A1 | 1/2024 | Bergström et al. |
| 2024/0111367 A1 | 4/2024 | Wassvik et al. |

FOREIGN PATENT DOCUMENTS

| | | |
|---|---|---|
| CA | 2745422 A1 | 6/2010 |
| CA | 2762681 A1 | 7/2012 |
| CN | 1794157 A | 6/2006 |
| CN | 101019071 A | 8/2007 |
| CN | 101075168 A | 11/2007 |
| CN | 101174191 A | 5/2008 |
| CN | 101206550 A | 6/2008 |
| CN | 201233592 Y | 5/2009 |
| CN | 101644854 A | 2/2010 |
| CN | 201437963 U | 4/2010 |
| CN | 201465071 U | 5/2010 |
| CN | 101882034 A | 11/2010 |

(56) References Cited

FOREIGN PATENT DOCUMENTS

| | | |
|---|---|---|
| CN | 102117155 A | 7/2011 |
| CN | 102929449 A | 2/2013 |
| CN | 202887145 U | 4/2013 |
| CN | 103123556 A | 5/2013 |
| CN | 203189466 U | 9/2013 |
| CN | 203224848 U | 10/2013 |
| CN | 203453994 U | 2/2014 |
| CN | 102414646 B | 4/2014 |
| CN | 203720812 U | 7/2014 |
| CN | 203786707 U | 8/2014 |
| CN | 203786708 U | 8/2014 |
| CN | 203825586 U | 9/2014 |
| CN | 104391611 A | 3/2015 |
| CN | 204288179 U | 4/2015 |
| CN | 104808843 A | 7/2015 |
| CN | 204695282 U | 10/2015 |
| CN | 105183241 A | 12/2015 |
| CN | 205015574 U | 2/2016 |
| CN | 205384833 U | 7/2016 |
| CN | 106648222 A | 5/2017 |
| CN | 206400503 U | 8/2017 |
| CN | 105320382 B | 4/2021 |
| CN | 113010053 A | 6/2021 |
| DE | 3511330 A1 | 10/1986 |
| DE | 68902419 T2 | 3/1993 |
| DE | 69000920 T2 | 6/1993 |
| DE | 19809934 A1 | 9/1999 |
| DE | 10026201 A1 | 12/2000 |
| DE | 10025175 A1 | 12/2001 |
| DE | 102009003990 A1 | 7/2010 |
| DE | 102010000473 A1 | 8/2010 |
| EP | 0600576 A1 | 6/1994 |
| EP | 0845812 A2 | 6/1998 |
| EP | 0897161 A1 | 2/1999 |
| EP | 0931731 A1 | 7/1999 |
| EP | 1126236 A1 | 8/2001 |
| EP | 1457870 A2 | 9/2004 |
| EP | 1471459 A2 | 10/2004 |
| EP | 1512989 A2 | 3/2005 |
| EP | 1798630 A2 | 6/2007 |
| EP | 1835464 A1 | 9/2007 |
| EP | 2077490 A2 | 7/2009 |
| EP | 2088501 A1 | 8/2009 |
| EP | 2314203 A1 | 4/2011 |
| EP | 2325735 A2 | 5/2011 |
| EP | 2339437 A2 | 6/2011 |
| EP | 0985206 B1 | 3/2012 |
| EP | 2442180 A1 | 4/2012 |
| EP | 2466428 A2 | 6/2012 |
| EP | 2466429 A1 | 6/2012 |
| EP | 2479642 A1 | 7/2012 |
| EP | 2515216 A1 | 10/2012 |
| EP | 2565770 A2 | 3/2013 |
| EP | 2765622 A2 | 8/2014 |
| EP | 2778849 A1 | 9/2014 |
| EP | 2797143 A1 | 10/2014 |
| EP | 2840470 A2 | 2/2015 |
| EP | 3002666 | 4/2016 |
| EP | 3043242 A1 | 7/2016 |
| EP | 3535640 A1 | 9/2019 |
| EP | 3537269 A1 | 9/2019 |
| EP | 3644167 A1 | 4/2020 |
| FR | 2172828 A1 | 10/1973 |
| FR | 2617619 A1 | 1/1989 |
| FR | 2617620 A1 | 1/1989 |
| FR | 2614711 B1 | 3/1992 |
| FR | 2676275 A1 | 11/1992 |
| GB | 1380144 A | 1/1975 |
| GB | 2131544 A | 6/1984 |
| GB | 2204126 A | 11/1988 |
| GB | 2263765 A | 8/1993 |
| GB | 2472444 A | 2/2011 |
| JP | 62-159213 A | 7/1987 |
| JP | 05-190066 A | 7/1993 |
| JP | 11-085399 A | 3/1999 |
| JP | 2000-506655 A | 5/2000 |
| JP | 2000-172438 A | 6/2000 |
| JP | 2000-259334 A | 9/2000 |
| JP | 2000-268824 A | 9/2000 |
| JP | 2000-293311 A | 10/2000 |
| JP | 2003-330603 A | 11/2003 |
| JP | 2005-004278 A | 1/2005 |
| JP | 2008-506173 A | 2/2008 |
| JP | 2009-004139 A | 1/2009 |
| JP | 2009-543173 A | 12/2009 |
| JP | 2010-238426 A | 10/2010 |
| JP | 2011-530124 A | 12/2011 |
| JP | 2015-038862 A | 2/2015 |
| JP | 2015-049965 A | 3/2015 |
| JP | 2015-158831 A | 9/2015 |
| JP | 2016-192688 A | 11/2016 |
| JP | 6211595 B2 | 10/2017 |
| KR | 10-2001-0060254 A | 7/2001 |
| KR | 10-0359400 B1 | 10/2002 |
| KR | 10-0940435 B1 | 2/2010 |
| KR | 10-1081586 B1 | 11/2011 |
| KR | 10-1319543 B1 | 10/2013 |
| KR | 10-2015-0125374 A | 11/2015 |
| KR | 10-2016-0075643 A | 6/2016 |
| TW | M517370 U | 2/2016 |
| WO | 84/03186 A1 | 8/1984 |
| WO | 95/27919 A2 | 10/1995 |
| WO | 96/10148 A1 | 4/1996 |
| WO | 96/23649 A1 | 8/1996 |
| WO | 99/46602 A1 | 9/1999 |
| WO | 00/50807 A1 | 8/2000 |
| WO | 01/20781 A1 | 3/2001 |
| WO | 01/27867 A1 | 4/2001 |
| WO | 01/71654 A1 | 9/2001 |
| WO | 01/84251 A2 | 11/2001 |
| WO | 02/07072 A2 | 1/2002 |
| WO | 02/35460 A1 | 5/2002 |
| WO | 02/77915 A2 | 10/2002 |
| WO | 02/95668 A1 | 11/2002 |
| WO | 03/41006 A1 | 5/2003 |
| WO | 03/76870 A1 | 9/2003 |
| WO | 2004/032210 A2 | 4/2004 |
| WO | 2004/081502 A2 | 9/2004 |
| WO | 2004/081956 A2 | 9/2004 |
| WO | 2005/026938 A2 | 3/2005 |
| WO | 2005/029172 A2 | 3/2005 |
| WO | 2005/029395 A2 | 3/2005 |
| WO | 2005/125011 A2 | 12/2005 |
| WO | 2006/003245 A1 | 1/2006 |
| WO | 2006/081633 A1 | 8/2006 |
| WO | 2006/095320 A2 | 9/2006 |
| WO | 2006/124551 A2 | 11/2006 |
| WO | 2007/003196 A2 | 1/2007 |
| WO | 2007/047685 A2 | 4/2007 |
| WO | 2007/058924 A2 | 5/2007 |
| WO | 2007/112742 A1 | 10/2007 |
| WO | 2008/004097 A2 | 1/2008 |
| WO | 2008/004103 A2 | 1/2008 |
| WO | 2008/007276 A2 | 1/2008 |
| WO | 2008/007372 A2 | 1/2008 |
| WO | 2008/017077 A2 | 2/2008 |
| WO | 2008/032270 A2 | 3/2008 |
| WO | 2008/034184 A1 | 3/2008 |
| WO | 2008/038066 A2 | 4/2008 |
| WO | 2008/039006 A1 | 4/2008 |
| WO | WO 2008/044024 | 4/2008 |
| WO | 2008/068607 A2 | 6/2008 |
| WO | 2009/000289 A1 | 12/2008 |
| WO | 2009/007704 A1 | 1/2009 |
| WO | 2009/029764 A1 | 3/2009 |
| WO | 2009/048365 A1 | 4/2009 |
| WO | 2009/077962 A1 | 6/2009 |
| WO | 2009/102681 A2 | 8/2009 |
| WO | 2009/135320 A1 | 11/2009 |
| WO | 2009/137355 A2 | 11/2009 |
| WO | 2010/006882 A2 | 1/2010 |
| WO | 2010/006883 A2 | 1/2010 |
| WO | 2010/006884 A2 | 1/2010 |
| WO | 2010/006885 A2 | 1/2010 |

(56) References Cited

FOREIGN PATENT DOCUMENTS

| | | |
|---|---|---|
| WO | 2010/006886 A2 | 1/2010 |
| WO | 2010/015408 A1 | 2/2010 |
| WO | 2010/015410 A2 | 2/2010 |
| WO | 2010/046539 A1 | 4/2010 |
| WO | 2010/056177 A1 | 5/2010 |
| WO | 2010/064983 A2 | 6/2010 |
| WO | 2010/081702 A2 | 7/2010 |
| WO | 2010/112404 A1 | 10/2010 |
| WO | 2010/123809 A2 | 10/2010 |
| WO | 2010/134865 A1 | 11/2010 |
| WO | 2011/028169 A1 | 3/2011 |
| WO | 2011/028170 A1 | 3/2011 |
| WO | 2011/031215 A1 | 3/2011 |
| WO | 2011/049511 A1 | 4/2011 |
| WO | 2011/049512 A1 | 4/2011 |
| WO | 2011/049513 A1 | 4/2011 |
| WO | 2011/057572 A1 | 5/2011 |
| WO | 2011/078769 A1 | 6/2011 |
| WO | 2011/082477 A1 | 7/2011 |
| WO | 2011/104673 A1 | 9/2011 |
| WO | 2011/119483 A1 | 9/2011 |
| WO | 2012/002894 A1 | 1/2012 |
| WO | 2012/005051 A1 | 1/2012 |
| WO | 2012/010078 A1 | 1/2012 |
| WO | 2012/012165 A1 | 1/2012 |
| WO | 2012/015810 A2 | 2/2012 |
| WO | 2012/018176 A2 | 2/2012 |
| WO | 2012/050510 A1 | 4/2012 |
| WO | 2012/082055 A1 | 6/2012 |
| WO | 2012/105893 A1 | 8/2012 |
| WO | 2012/121652 A1 | 9/2012 |
| WO | 2012/158105 A2 | 11/2012 |
| WO | 2012/171181 A1 | 12/2012 |
| WO | 2012/172302 A1 | 12/2012 |
| WO | 2012/176801 A1 | 12/2012 |
| WO | 2013/011571 A1 | 1/2013 |
| WO | 2013/014534 A2 | 1/2013 |
| WO | 2013/036192 A1 | 3/2013 |
| WO | 2013/048312 A2 | 4/2013 |
| WO | 2013/055282 A2 | 4/2013 |
| WO | 2013/062471 A2 | 5/2013 |
| WO | 2013/081818 A1 | 6/2013 |
| WO | 2013/089622 A2 | 6/2013 |
| WO | 2013/108031 A2 | 7/2013 |
| WO | 2013/115210 A2 | 8/2013 |
| WO | 2013/126005 A2 | 8/2013 |
| WO | 2013/133756 A1 | 9/2013 |
| WO | 2013/133757 A2 | 9/2013 |
| WO | 2013/138003 A1 | 9/2013 |
| WO | 2013/159472 A1 | 10/2013 |
| WO | 2013/165305 A2 | 11/2013 |
| WO | 2013/165306 A2 | 11/2013 |
| WO | 2013/176613 A2 | 11/2013 |
| WO | 2013/176614 A2 | 11/2013 |
| WO | 2013/176615 A2 | 11/2013 |
| WO | 2013/191638 A1 | 12/2013 |
| WO | 2014/016685 A1 | 1/2014 |
| WO | 2014/017973 A1 | 1/2014 |
| WO | 2014/027241 A2 | 2/2014 |
| WO | 2014/037963 A1 | 3/2014 |
| WO | 2014/044181 A1 | 3/2014 |
| WO | 2014/055809 A1 | 4/2014 |
| WO | 2014/065601 A1 | 5/2014 |
| WO | 2014/086084 A1 | 6/2014 |
| WO | 2014/093937 A1 | 6/2014 |
| WO | 2014/098742 A1 | 6/2014 |
| WO | 2014/104967 A1 | 7/2014 |
| WO | 2014/130515 A1 | 8/2014 |
| WO | 2014/131221 A1 | 9/2014 |
| WO | 2015/029350 A1 | 3/2015 |
| WO | 2015/084644 A1 | 6/2015 |
| WO | 2015/123322 A1 | 8/2015 |
| WO | 2015/175586 A1 | 11/2015 |
| WO | 2015/199602 A1 | 12/2015 |
| WO | 2016/130074 A1 | 8/2016 |
| WO | 2016/160745 A1 | 10/2016 |
| WO | 2016/177592 A1 | 11/2016 |
| WO | 2017/026821 A1 | 2/2017 |
| WO | 2017/099657 A1 | 6/2017 |
| WO | 2017/138863 A1 | 8/2017 |
| WO | 2018/003929 A1 | 1/2018 |
| WO | 2018/096430 A1 | 5/2018 |
| WO | 2018/106172 A1 | 6/2018 |
| WO | 2018/106176 A1 | 6/2018 |
| WO | 2018/141948 A1 | 8/2018 |
| WO | 2018/182476 A1 | 10/2018 |
| WO | 2019/045629 A1 | 3/2019 |
| WO | 2019/156609 A1 | 8/2019 |
| WO | 2019/172826 A1 | 9/2019 |
| WO | 2019/172827 A1 | 9/2019 |
| WO | 2020/022096 A1 | 1/2020 |
| WO | 2020/078339 A1 | 4/2020 |
| WO | 2020/078749 A1 | 4/2020 |
| WO | 2020/168802 A1 | 8/2020 |

OTHER PUBLICATIONS

Ahn Y. et al., in"A slim and wide multi-touch tabletop interface and its applications," BigComp2014, IEEE, 2014, 6 pages.
Anderson, R. Rox, B.S., and John A. Parrish, M.D. "The Optics of Human Skin." Journal of Investigative Dermatology 77.1 (1981): 13-19.
ASTM International, "Standard Specification for Heat-Treated Flat Glass-Kind HS, Kind FT Coated and Uncoated Glass," Designation: C 1048-04, in 7 pages.
Barzilai et al., "Two-Point Step Size Gradient Methods", IMA Journal of Numerical Analysis, 1988, pp. 141-148.
Bose, R, "Strongly regular graphs, partial geometries and partially balanced designs", Pacific J. Math., vol. 13, No. 2 (1963), pp. 389-419.
British Standard, "Glass in building—Thermally toughened soda lime silicate safety glass," EN 12150- 1:2000, ISBN 0 580 36171 3, Aug. 15, 2000, in 28 pages.
Chen. Yhun, "Using micro-structures to couple light into thin light-guides," Master of Science Thesis, Stockholm, 2011.
Chou, N., et al., "Generalized pseudo-polar Fourier grids and applications in regfersting optical coherence tomography images," 43rd Asilomar Conference on Signals, Systems and Computers, Nov. 2009, in 5 pages.
Civil Cover Sheet *Flatfrog Laboratories AB v. Promethean Ltd. and Promethean Inc.*, dated Dec. 10, 2019, in 1 page.
Communication pursuant to Article 94(3) in EP Application No. 20816652.0 dated Feb. 16, 2024.
Complaint for Patent Infringement, *Flatfrog Laboratories AB v. Promethean Ltd. and Promethean Inc.*, C.A. No. 19-2246, dated Dec. 10, 2019, in 83 pages.
Cornelissen, Hugo J. et al. "Injecting Light of High-Power LEDs into Thin Light Guides." Proc. SPIE 7652. International Optical Design Conference (2010): 7652121-7652126.
Defendants Promethean Ltd. and Promethean Inc.'s Preliminary Proposed Claim Constructions, *Flatfrog Laboratories AB v. Promethean Ltd. and Promethean Inc.*, C.A. No. 1:19-cv-02246-MN, dated May 24, 2021, in 8 pages.
Defendants' Answer to Second Amended Complaint and Defendant Promethean Inc.'s Counterclaims Against FlatFrog Laboratories AB., C.A. No. 19-2246, dated May 22, 2020, in 29 pages.
Defendants' Initial Invalidity Contentions, *Flatfrog Laboratories AB v. Promethean Ltd. and Promethean Inc.*, C.A. No. 1:19-cv-02246-MN, dated Apr. 23, 2021, in 26 pages.
Defendants' Sur-Reply Claim Construction Brief, *Flatfrog Laboratories AB v. Promethean Ltd. and Promethean Inc.*, C.A. No. 1:19-cv-02246-MN, dated Sep. 13, 2021, in 24 pages.
Ericson, Chris, "Real-Time Collision Detection", The Morgan Kaufmann Series in Interactive 30 Technology (2005) Chapters 5-9, pp. 125-412.
European Examination Report dated Aug. 3, 2015 issued in corresponding European Application No. 12860074.9.
European Office Action issued in European Patent Application No. 13183545, dated Feb. 12, 2014.

(56) References Cited

OTHER PUBLICATIONS

European Search Report dated Apr. 19, 2012 issued in European Application No. 09830665.7.
European Search Report dated Jan. 23, 2014 issued in corresponding European Appln. No. 13183545.6.
European Search Report issued in European Application No. 11777650.0, dated Nov. 22, 2013.
Executed Summons in a Civil Action to Promethean Inc., C.A. No. 19-2246, dated Dec. 10, 2019 in 2 pages.
Exhibit 1: Invalidity Claim Chart Against U.S. Pat. No. 10,775,935 Based on Prior Public Use and/or Commercial Offer for Sale of Defendant Promethean Inc.'s ActivPanel 4.5 Product, *Flatfrog Laboratories AB v. Promethean Ltd. and Promethean Inc.*, C.A. No. 1:19-cv-02246-MN, dated Apr. 23, 2021, in 26 pages.
Exhibit 10: Invalidity Claim Chart Against U.S. Pat. No. 10,739,916 Based on International App. Pub. No. W02014131221 to Chen et al., *Flatfrog Laboratories AB v. Promethean Ltd. and Promethean Inc.*, C.A. No. 1:19-cv-02246-MN, dated Apr. 23, 2021, in 26 pages.
Exhibit 11: Invalidity Claim Chart Against U.S. Pat. No. 10,739,916 Based on Chinese Pub. App. No. 104391611 A to Hu et al., *Flatfrog Laboratories AB v. Promethean Ltd. and Promethean Inc.*, C.A. No. 1:19-cv-02246-MN, dated Apr. 23, 2021, in 26 pages.
Exhibit 12: Invalidity Claim Chart Against U.S. Pat. No. 10,739,916 Based on Chinese Utility Model No. 203786708 U to Cao, *Flatfrog Laboratories AB v. Promethean Ltd. and Promethean Inc.*, C.A. No. 1:19-cv-02246-MN, dated Apr. 23, 2021, in 26 pages.
Exhibit 13: Invalidity Claim Chart Against U.S. Pat. No. 10,739,916 Based on Chinese Utility Model No. 204288179 U to Mo et al., *Flatfrog Laboratories AB v. Promethean Ltd. and Promethean Inc.*, C.A. No. 1:19-cv-02246-MN, dated Apr. 23, 2021, in 26 pages.
Exhibit 2: Invalidity Claim Chart Against U.S. Pat. No. 10,775,935 Based on U.S. Patent No. U.S. Pre-Grant Pub. No. 2019/0235701 to Han et al., *Flatfrog Laboratories AB v. Promethean Ltd. and Promethean Inc.*, C.A. No. 1:19-cv-02246-MN, dated Apr. 23, 2021, in 26 pages.
Exhibit 3A: Invalidity Claim Chart Against U.S. Pat. No. 10,775,935 Based on U.S. Pat. No. 4,751,379 to Sasaki et al., *Flatfrog Laboratories AB v. Promethean Ltd. and Promethean Inc.*, C.A. No. 1:19-cv-02246-MN, dated Apr. 23, 2021, in 26 pages.
Exhibit 4A: Invalidity Claim Chart Against U.S. Pat. No. 10,775,935 Based on U.S. Pre-Grant Pub. No. 2019/0004668 to Jeong et al., *Flatfrog Laboratories AB v. Promethean Ltd. and Promethean Inc.*, C.A. No. 1:19-cv-02246-MN, dated Apr. 23, 2021, in 26 pages.
Exhibit 5A: Invalidity Claim Chart Against U.S. Pat. No. 10,775,935 Based on U.S. Pat. No. 9,983,626 to Cao et al., *Flatfrog Laboratories AB v. Promethean Ltd. and Promethean Inc.*, C.A. No. 1:19-cv-02246-MN, dated Apr. 23, 2021, in 26 pages.
Exhibit 6A: Invalidity Claim Chart Against U.S. Pat. No. 10,775,935 Based on U.S. Pre-Grant Pub. No. 2019/0025984 to Weilbacher et al., *Flatfrog Laboratories AB v. Promethean Ltd. and Promethean Inc.*, C.A. No. 1:19-cv-02246-MN, dated Apr. 23, 2021, in 26 pages.
Exhibit 7A: Invalidity Claim Chart Against U.S. Pat. No. 10,775,935 Based on U.S. Pat. No. 9,207,800 to Eriksson et al., *Flatfrog Laboratories AB v. Promethean Ltd. and Promethean Inc.*, C.A. No. 1:19-cv-02246-MN, dated Apr. 23, 2021, in 26 pages.
Exhibit 8: Invalidity Claim Chart Against U.S. Pat. No. 10,739,916 Based on Prior Public Use and/or Commercial Offer for Sale of Defendant Promethean Inc.'s ActivPanel 4.5 Product, *Flatfrog Laboratories AB v. Promethean Ltd. and Promethean Inc.*, C.A. No. 1:19-cv-02246-MN, dated Apr. 23, 2021, in 26 pages.
Exhibit 9: Invalidity Claim Chart Against U.S. Pat. No. 10,739,916 Based on Chinese Utility Model No. CN 203786707 U to Chen et al., *Flatfrog Laboratories AB v. Promethean Ltd. and Promethean Inc.*, C.A. No. 1:19-cv-02246-MN, dated Apr. 23, 2021, in 26 pages.
Extended (Supplementary) European Search Report dated Apr. 30, 2021, issued in counterpart EP application No. 19775915.2. (8 pages).
Extended European Search Report for European App. No. 16743795.3, dated Sep. 11, 2018, in 5 pages.
Extended European Search Report for European App. No. 18772178.2, dated Dec. 10, 2020, in 8 pages.
Extended European Search Report for European App. No. 18772370.5, dated Dec. 9, 2020, in 8 pages.
Extended European Search Report for European App. No. 18774232.5, dated Dec. 21, 2020, in 9 pages.
Extended European Search Report in European Application No. 17750516.1, dated Jul. 16, 2019 in 5 pages.
Extended European Search Report in European Application No. 19165019.1, dated Jul. 18, 2019 in 8 pages.
Extended European Search Report in European Application No. 16873465.5, date Jun. 25, 2019 in 9 pages.
Farghal, et al., "Electromagnetic Modeling of Outcoupling Efficiency and Light Emission In Near-Infrared Quantum Dot Light Emitting Devices", published in Progress in Electromagnetics Research B., vol. 24, 263-284, 2010.
Fihn, M., "Touch Panel—Special Edition," Veritas et Visus, Nov. 2011, in 1 page.
Final Office Action dated Nov. 24, 2017 in U.S. Appl. No. 14/652,757.
Final Office Action issued Nov. 30, 2017 in U.S. Appl. No. 14/652,736.
Giphy | Stickers | Closer Look Sticker by Cavan Infante, posted on May 24, 2019 by Cavan Infante, no copyright date posted [online], [site visited Oct. 13, 2020], Available from Internet, <URL: https://giphy.com/stickers/circle-underline-cavan-ZbB9ICitwN43fJvNSz/>.
Golub et al., "Matrix Computations", Third Edition, The Johns Hopkins University Press, 1996, 716 pages.
Golub et al.: "Matrix Norms" in: "Matrix Computations" Aug. 21, 2005 (Aug. 21, 2005), Johns Hopkins University Press, pp. 54-59.s.
Holzammer, Andereas "Combining Diffuse Illumination and Frustrated Total Internal Reflection for touch detection", Oct. 22, 2009 (Oct. 22, 2009), Retrieved from the Internet: URL:http://www.eecs.tu-berlin.de/fileadmin/fg144/Research/Theses/Holzammer/Thesis Andreas holzammer.pdf.
Horwood, A. et al.: "Image Normalization, a Basic Requirement for Computer-based Automatic Diagnostic Applications", May 1, 2001 (May 1, 2001), retrieved from the Internet: URL:http://facweb.cs.depaul.edu/research/vc/seminar/Paper/Feb22_2008Emili_ImageNormali zation.pdf*Paae 9, line 1- Paae 14, line 1.
Iizuka, K., "Boundaries, Near-Field Optics, and Near-Field Imaging," Elements of Photonics, vol. 1: In Free Space and Special Media, Wiley & Sons, 2002, in 57 pages.
International Preliminary Report on Patentability received in International Application No. PCT/SE2017/051233, dated Jun. 11, 2019, in 6 pages.
International Preliminary Report on Patentability received for PCT Patent Application No. PCT/EP2018/052757, mailed on Aug. 15, 2019, 7 pages.
International Preliminary Report on Patentability received for PCT Patent Application No. PCT/EP2019/077054, mailed on Apr. 29, 2021, 7 pages.
International Preliminary Report on Patentability received for PCT Patent Application No. PCT/IB2017/057201, mailed on Jun. 6, 2019, 8 pages.
International Preliminary Report on Patentability received for PCT Patent Application No. PCT/JP2019/001801, mailed on Oct. 15, 2020, 12 pages (6 pages of English Translation and 6 pages of Original Document).
International Preliminary Report on Patentability received for PCT Patent Application No. PCT/SE2009/051364, mailed on Jun. 16, 2011, 11 pages.
International Preliminary Report on Patentability received for PCT Patent Application No. PCT/SE2011/050520, mailed on Nov. 15, 2012, 6 pages.
International Preliminary Report on Patentability received for PCT Patent Application No. PCT/SE2011/050871, mailed on Jan. 17, 2013, 10 pages.
International Preliminary Report on Patentability received for PCT Patent Application No. PCT/SE2012/050086, mailed on Aug. 15, 2013, 8 pages.

(56) References Cited

OTHER PUBLICATIONS

International Preliminary Report on Patentability received for PCT Patent Application No. PCT/SE2012/051419, mailed on Jul. 3, 2014, 6 pages.
International Preliminary Report on Patentability received for PCT Patent Application No. PCT/SE2013/050064, mailed on Aug. 14, 2014, 7 pages.
International Preliminary Report on Patentability received for PCT Patent Application No. PCT/SE2013/050137, mailed on Sep. 4, 2014, 6 pages.
International Preliminary Report on Patentability received for PCT Patent Application No. PCT/SE2013/050473, mailed on Nov. 13, 2014, 8 pages.
International Preliminary Report on Patentability received for PCT Patent Application No. PCT/SE2013/050585, mailed on Dec. 4, 2014, 10 pages.
International Preliminary Report on Patentability received for PCT Patent Application No. PCT/SE2013/051044, mailed on Mar. 26, 2015, 7 pages.
International Preliminary Report on Patentability received for PCT Patent Application No. PCT/SE2013/051533, mailed on Jul. 2, 2015, 8 pages.
International Preliminary Report on Patentability received for PCT Patent Application No. PCT/SE2013/051534, mailed on Jul. 2, 2015, 8 pages.
International Preliminary Report on Patentability received for PCT Patent Application No. PCT/SE2013/051537, mailed on Jul. 2, 2015, 9 pages.
International Preliminary Report on Patentability received for PCT Patent Application No. PCT/SE2014/050435, mailed on Oct. 22, 2015, 8 pages.
International Preliminary Report on Patentability received for PCT Patent Application No. PCT/SE2014/050437, mailed on Oct. 22, 2015, 6 pages.
International Preliminary Report on Patentability received for PCT Patent Application No. PCT/SE2014/050438, mailed on Oct. 22, 2015, 6 pages.
International Preliminary Report on Patentability received for PCT Patent Application No. PCT/SE2014/050701, mailed on Jan. 21, 2016, 8 pages.
International Preliminary Report on Patentability received for PCT Patent Application No. PCT/SE2014/051363, mailed on Jun. 2, 2016, 6 pages.
International Preliminary Report on Patentability received for PCT Patent Application No. PCT/SE2015/050041, mailed on Jul. 28, 2016, 10 pages.
International Preliminary Report on Patentability received for PCT Patent Application No. PCT/SE2015/050042, mailed on Jul. 28, 2016, 10 pages.
International Preliminary Report on Patentability received for PCT Patent Application No. PCT/SE2015/050043, mailed on Jul. 28, 2016, 9 pages.
International Preliminary Report on Patentability received for PCT Patent Application No. PCT/SE2015/050044, mailed on Jul. 28, 2016, 8 pages.
International Preliminary Report on Patentability received for PCT Patent Application No. PCT/SE2015/050724, mailed on Jan. 5, 2017, 7 pages.
International Preliminary Report on Patentability received for PCT Patent Application No. PCT/SE2016/050053, mailed on Aug. 10, 2017, 13 pages.
International Preliminary Report on Patentability received for PCT Patent Application No. PCT/SE2016/050098, mailed on Aug. 24, 2017, 9 pages.
International Preliminary Report on Patentability received for PCT Patent Application No. PCT/SE2016/050155, mailed on Sep. 14, 2017, 7 pages.
International Preliminary Report on Patentability received for PCT Patent Application No. PCT/SE2016/051229, mailed on Jun. 21, 2018, 15 pages.
International Preliminary Report on Patentability received for PCT Patent Application No. PCT/SE2017/050102, mailed on Aug. 23, 2018, 9 pages.
International Preliminary Report on Patentability received for PCT Patent Application No. PCT/SE2017/051224, mailed on Feb. 26, 2019, 13 pages.
International Preliminary Report on Patentability received for PCT Patent Application No. PCT/SE2018/050070, mailed on Aug. 22, 2019, 10 pages.
International Preliminary Report on Patentability received for PCT Patent Application No. PCT/SE2018/050109, mailed on Oct. 10, 2019, 12 pages.
International Preliminary Report on Patentability received for PCT Patent Application No. PCT/SE2018/050817, mailed on Mar. 5, 2020, 9 pages.
International Preliminary Report on Patentability received for PCT Patent Application No. PCT/SE2018/050896, mailed on Mar. 19, 2020, 10 pages.
International Preliminary Report on Patentability received for PCT Patent Application No. PCT/SE2019/050189, mailed on Sep. 17, 2020, 9 pages.
International Preliminary Report on Patentability received for PCT Patent Application No. PCT/SE2019/050190, mailed on Sep. 17, 2020, 8 pages.
International Preliminary Report on Patentability received for PCT Patent Application No. PCT/SE2019/050193, mailed on Sep. 17, 2020, 8 pages.
International Preliminary Report on Patentability received for PCT Patent Application No. PCT/SE2019/050195, mailed on Oct. 1, 2020, 10 pages.
International Preliminary Report on Patentability received for PCT Patent Application No. PCT/SE2019/050953, mailed on Apr. 29, 2021, 11 pages.
International Preliminary Report on Patentability received for PCT Patent Application No. PCT/SE2020/050504, mailed on Dec. 2, 2021, 10 pages.
International Preliminary Report on Patentability received for PCT Patent Application No. PCT/SE2020/051117, mailed on Jun. 9, 2022, 10 pages.
International Preliminary Report on Patentability received for PCT Patent Application No. PCT/SE2020/051172, mailed on Jun. 16, 2022, 8 pages.
International Preliminary Report on Patentability received for PCT Patent Application No. PCT/SE2021/050040, mailed on Aug. 25, 2022, 13 pages.
International Preliminary Report on Patentability received for PCT Patent Application No. PCT/SE2021/050095, mailed on Aug. 18, 2022, 11 pages.
International Preliminary Report on Patentability received for PCT Patent Application No. PCT/SE2021/051018, mailed on May 4, 2023, 8 pages.
International Preliminary Report on Patentability received for PCT Patent Application No. PCT/SE2021/051151, mailed on Jun. 1, 2023, 10 pages.
International Preliminary Report on Patentability received for PCT Patent Application No. PCT/SE22/050139, mailed on Aug. 24, 2023, 9 pages.
International Search Report and Written Opinion for International App. No. PCT/SE2019/050343, dated Sep. 3, 2019, in 13 pages.
International Search Report and Written Opinion issued in International Application No. PCT/SE2010/051103 dated Jan. 25, 2011.
International Search Report and Written Opinion issued in International Application No. PCT/SE2010/051105 dated Nov. 16, 2010.
International Search Report and Written Opinion issued in International Application No. PCT/SE2010/051107 dated Jan. 24, 2011.
International Search Report and Written Opinion received for PCT Patent Application No. PCT/SE2013/050064, mailed on Sep. 12, 2013, 10 pages.
International Search Report and Written Opinion received for PCT Patent Application No. PCT/SE2019/050190, mailed on Jun. 12, 2019, 11 pages.

(56) References Cited

OTHER PUBLICATIONS

International Search Report and Written Opinion received for PCT Patent Application No. PCT/EP2018/052757, mailed on Apr. 23, 2018, 9 pages.
International Search Report and Written Opinion received for PCT Patent Application No. PCT/EP2019/077054, mailed on Jan. 10, 2020, 9 pages.
International Search Report and Written Opinion received for PCT Patent Application No. PCT/IB2017/057201, mailed on Mar. 6, 2018, 12 pages.
International Search Report and Written Opinion received for PCT Patent Application No. PCT/JP2019/001801, mailed on Apr. 23, 2019, 13 pages (6 pages of English Translation and 7 pages of Original Document).
International Search Report and Written Opinion received for PCT Patent Application No. PCT/SE2009/051364, mailed on May 4, 2010, 15 pages.
International Search Report and Written Opinion received for PCT Patent Application No. PCT/SE2011/050520, mailed on Aug. 18, 2011, 8 pages.
International Search Report and Written Opinion received for PCT Patent Application No. PCT/SE2012/051419, mailed on Aug. 26, 2013, 8 pages.
International Search Report and Written Opinion received for PCT Patent Application No. PCT/SE2013/050137, mailed on Oct. 15, 2013, 9 pages.
International Search Report and Written Opinion received for PCT Patent Application No. PCT/SE2013/050473, mailed on Feb. 3, 2014, 11 pages.
International Search Report and Written Opinion received for PCT Patent Application No. PCT/SE2013/050585, mailed on Jan. 21, 2014, 13 pages.
International Search Report and Written Opinion received for PCT Patent Application No. PCT/SE2013/051044, mailed on Mar. 20, 2014, 9 pages.
International Search Report and Written Opinion received for PCT Patent Application No. PCT/SE2013/051533, mailed on Apr. 15, 2014, 10 pages.
International Search Report and Written Opinion received for PCT Patent Application No. PCT/SE2013/051534, mailed on May 6, 2014, 11 pages.
International Search Report and Written Opinion received for PCT Patent Application No. PCT/SE2013/051537, mailed on Apr. 25, 2014, 12 pages.
International Search Report and Written Opinion received for PCT Patent Application No. PCT/SE2014/050435, mailed on Jun. 12, 2014, 11 pages.
International Search Report and Written Opinion received for PCT Patent Application No. PCT/SE2014/050437, mailed on Jul. 1, 2014, 9 pages.
International Search Report and Written Opinion received for PCT Patent Application No. PCT/SE2014/050438, mailed on Jul. 1, 2014, 9 pages.
International Search Report and Written Opinion received for PCT Patent Application No. PCT/SE2014/050701, mailed on Nov. 6, 2014, 11 pages.
International Search Report and Written Opinion received for PCT Patent Application No. PCT/SE2014/051363, mailed on Feb. 12, 2015, 9 pages.
International Search Report and Written Opinion received for PCT Patent Application No. PCT/SE2015/050041, mailed on Apr. 29, 2015, 12 pages.
International Search Report and Written Opinion received for PCT Patent Application No. PCT/SE2015/050042, mailed on Sep. 28, 2015, 14 pages.
International Search Report and Written Opinion received for PCT Patent Application No. PCT/SE2015/050043, mailed on May 19, 2015, 12 pages.
International Search Report and Written Opinion received for PCT Patent Application No. PCT/SE2015/050044, mailed on May 19, 2015, 11 pages.
International Search Report and Written Opinion received for PCT Patent Application No. PCT/SE2015/050724, mailed on Oct. 6, 2015, 10 pages.
International Search Report and Written Opinion received for PCT Patent Application No. PCT/SE2016/050053, mailed on May 2, 2016, 16 pages.
International Search Report and Written Opinion received for PCT Patent Application No. PCT/SE2016/050098, mailed on Jun. 29, 2016, 13 pages.
International Search Report and Written Opinion received for PCT Patent Application No. PCT/SE2016/050155, mailed on Jul. 15, 2016, 10 pages.
International Search Report and Written Opinion received for PCT Patent Application No. PCT/SE2016/051229, mailed on Mar. 10, 2017, 18 pages.
International Search Report and Written Opinion received for PCT Patent Application No. PCT/SE2017/050102, mailed on Apr. 5, 2017, 12 pages.
International Search Report and Written Opinion received for PCT Patent Application No. PCT/SE2017/051224, mailed on Feb. 23, 2018, 17 pages.
International Search Report and Written Opinion received for PCT Patent Application No. PCT/SE2017/051233, mailed on Mar. 12, 2018, 10 pages.
International Search Report and Written Opinion received for PCT Patent Application No. PCT/SE2018/050070, mailed on Apr. 25, 2018, 13 pages.
International Search Report and Written Opinion received for PCT Patent Application No. PCT/SE2018/050109, mailed on May 3, 2018, 15 pages.
International Search Report and Written Opinion received for PCT Patent Application No. PCT/SE2018/050817, mailed on Jan. 28, 2019, 12 pages.
International Search Report and Written Opinion received for PCT Patent Application No. PCT/SE2018/050896, mailed on Nov. 27, 2018, 13 pages.
International Search Report and Written Opinion received for PCT Patent Application No. PCT/SE2019/050189, mailed on May 29, 2019, 12 pages.
International Search Report and Written Opinion received for PCT Patent Application No. PCT/SE2019/050193, mailed on Apr. 10, 2019, 11 pages.
International Search Report and Written Opinion received for PCT Patent Application No. PCT/SE2019/050195, mailed on Jun. 12, 2019, 13 pages.
International Search Report and Written Opinion received for PCT Patent Application No. PCT/SE2019/050953, mailed on Nov. 26, 2019, 14 pages.
Swedish Search Report dated Dec. 22, 2014 issued in corresponding Swedish Application No. 1450651-3.
Swedish Search Report dated Dec. 11, 2013 issued in corresponding Swedish Application No. 1350181-2.
Tedaldi, M., et al. "Refractive index mapping of layered samples using optical coherence refractometry," Proceedinas of SPIE, vol. 7171, 2009, in 8 pages.
The Laser Wall, MIT, 1997, http://web.media.mit.edu/"joep/SpectrumWeb/captions/Laser.html.
Thomas, G.L et al., "Some observations on fingerprint deposits." J. Phys. D: Appl. Phys. 8 (1975): 724-729.
Tympanus/Codrops | Animated Mesh Lines, posted on Jan. 8, 2019 by Jeremie Boulay, @ Codrops 2020 [online], [site visited Oct. 13, 2020], Available from Internet, <URL: https://tympanus.net/codrops/2019/01/08/animated-mesh-lines/>.
International Search Report and Written Opinion received for PCT Patent Application No. PCT/SE2020/050504, mailed on Sep. 4, 2020, 13 pages.
International Search Report and Written Opinion received for PCT Patent Application No. PCT/SE2020/051117, mailed on Feb. 5, 2021, 11 pages.

(56) References Cited

OTHER PUBLICATIONS

International Search Report and Written Opinion received for PCT Patent Application No. PCT/SE2020/051172, mailed on Feb. 4, 2021, 11 pages.
International Search Report and Written Opinion received for PCT Patent Application No. PCT/SE2021/050040, mailed on May 10, 2021, 15 pages.
International Search Report and Written Opinion received for PCT Patent Application No. PCT/SE2021/050095, mailed on Jun. 2, 2021, 16 pages.
International Search Report and Written Opinion received for PCT Patent Application No. PCT/SE2021/051018, mailed on Feb. 1, 2022, 10 pages.
International Search Report and Written Opinion received for PCT Patent Application No. PCT/SE2021/051151, mailed on Jan. 26, 2022, 13 pages.
International Search Report and Written Opinion received for PCT Patent Application No. PCT/SE2022/050139, mailed on Apr. 8, 2022, 12 pages.
International Search Report and Written Opinion received for PCT Patent Application No. PCT/SE2011/050871, mailed on Nov. 28, 2011, 13 pages.
International Search Report dated Sep. 25, 2015, in connection with SE 1550087-9 filed on Jan. 28, 2015.
International Search Report received for PCT Patent Application No. PCT/SE2015/050087, mailed on May 6, 2015, 4 pages.
International Search Report received for PCT Patent Application No. PCT/SE2018/050871, mailed on Jan. 25, 2019, 5 pages.
International Search Report received for PCT Patent Application No. PCT/SE2020/050043, mailed on Feb. 24, 2020, 5 pages.
International Search Report received for PCT Patent Application No. PCT/SE2021/050086, mailed Feb. 26, 2021, 6 pages.
Japanese Office Action issued in Japanese Patent Applicaiton No. 2011-539479, dated Feb. 25, 2014.
Johnson, M., "Enhanced Optical Touch Input Panel", IBM Technical Disclosure Bulletin, 1985, in 3 pages.
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 127 pages, (uploaded in 4 parts, part 1 of 4).
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 128 pages, (uploaded in 4 parts, part 4 of 4).
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 63 pages, (uploaded in 4 parts, part 2 of 4).
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 65 pages, (uploaded in 4 parts, part 3 of 4).
Joint Claim Construction Brief, *Flatfrog Laboratories AB v. Promethean Ltd. and Promethean Inc.*, C.A. No. 1:19-cv-02246-MN, dated Sep. 20, 2021, in 92 pages.
Joseph O'Rourke, "Computational Geometry in C", Second Edition, Cambridge University Press, (1998), pp. 252-264.
Kak, Avinash C. and Malcolm Slaney. Principles of Computerized Tomographic Imaging. New York: IEEE Press, 1988.
Kak, et al., "Principles of Computerized Tomographic Imaging", Institute of Electrical Enaineers, Inc., 1999, in 333 pages.
Kar-Han Tan, Robinson I N, Culbertson B, Apostolopoulos J, 'ConnectBoard: Enable Genuine Eye Contact and Accurate Gaze in Remote Collaboration', in: IEEE Transaction on Multimedia, 2011, June, vol. 13, No. 3, ISSN: 1520-9210.
Karsten Fourmont, Non-Equispaced Fast Fourier Transforms with Applications to Tomography, The Journal of Fourier Analysis and Applications, vol. 9, Issue 5, 2003, pp. 431-450.
Liu, J., et al. "Multiple touch points identifying method, involves starting touch screen, driving specific emission tube, and computing and transmitting coordinate of touch points to computer system by direct lines throuah interface of touch screen," 2007, in 25 pages. Machine translation of JP 11-85399 (Year: 1999).
Maximilian Karl: "Entwicklung und Bau einer neuartigen Mehrfinger-Touchscreen basierend auf frustrierter Totalreflexion," Landeswettbewerb in Bayern 2008 Jugend Forscht, Apr. 1, 2008.
McBeth, "Randi, the Badly Drawn Horse", Giphy, Online Available at https://giphy.com/stories/randy-the-badly-drawn-horse-258d6753-fb29, retrieved on Aug. 24, 2023, 15 pages.
Mu, Cong et al. "Dielectric multilayer angular filters for coupling LEDs to thin light guides." Proc SPIE 8170 (2011): 817001-1-817001-10.
Naitterer, F., et al. "Fourier Reconstruction," Mathematical Methods in Image Reconstruction, Society for Industrial and Applied Mathematics, 2001, in 12 pages.
Natterer, F., "The Mathematics of Computerized Tomography", Society for Industrial and Applied Mathematics, 2001, in 240 pages.
Non-Final Office Action dated May 4, 2017 in U.S. Appl. No. 14/652,757.
Non-Final Office Action issued Jun. 14, 2018 in U.S. Appl. No. 14/652,757.
Non-Final Office Action issued Jun. 20, 2018 in U.S. Appl. No. 14/652,736.
Non-Final Office Action issued Mar. 23, 2017 in U.S. Appl. No. 14/652,736.
Notice of Service, *Flatfrog Laboratories AB v. Promethean Ltd. and Promethean Inc.*, C.A. No. 1:19-cv-02246-MN, dated Apr. 23, 2021, in 2 paaes.
Office Action dated Aug. 13, 2015, in connection with Sweden Application No. 1550096-0, filed Jan. 30, 2015.
Panzer, et al., "Tunable Infrared Emission From Printed Colloidal Quantum Dot/Polymer Composite Films on Flexible Substrates", published in Journal of Display Technology, vol. 6, No. 3, Mar. 2010.
Paradiso, J.A., "Several Sensor Approaches that Retrofit Large Surfaces for Interactivity," ACM Ubicomp 2002 Workshop on Collaboration with Interactive Walls and Tables, 2002, in 8 pages.
Press et al., "Numerical Recipes The Art of Scientific Computing", Third Edition, Cambridge University Press, 2007, pp. 1-1235.
Report on the Filing or Determination of an Action Regarding a Patent or Trademark. For U.S. Appl. No. 10,282,035, U.S. District of Delaware, dated Dec. 10, 2019, in 1 page.
Scheuplein, Robert J., Ph.D. "A Survey of Some Fundamental Aspects of the Absorption and Reflection of Light by Tissue." J. Soc. Cos. Chem. 15 (1964): 111-122.
Summons in a Civil Action to Promethean Inc., C.A. No. 19/2246, dated Dec. 10, 2019 in 2 pages.
Supplemental ESR dated Aug. 27, 2015 issued in corresponding EP Appin No. 13752508.
Supplementary European Search Report for European App. No. EP 16759213, dated Oct. 4, 2018, in 9 pages.
Supplementary European Search Report dated Aug. 14, 2015 issued in corresponding European U.S. Appl. No. 13/744,212.
Supplementary European Search Report for European App. No. EP 13752508, dated Aug. 27, 2015.
Supplementary European Search Report for European App. No. EP 16749542, dated Sep. 17, 2018, in 9 pages.

\* cited by examiner

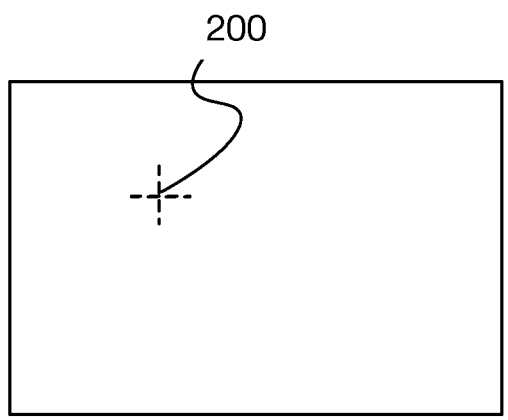
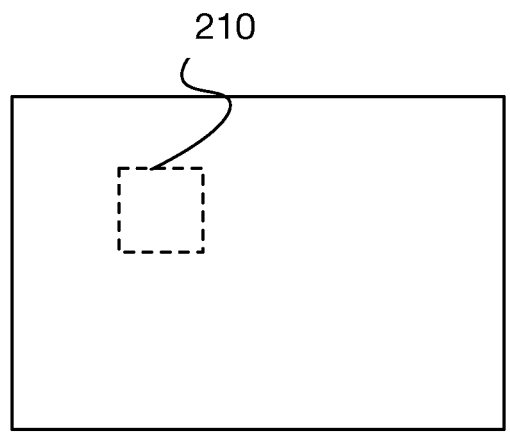
Figure 4a.
Figure 4b.
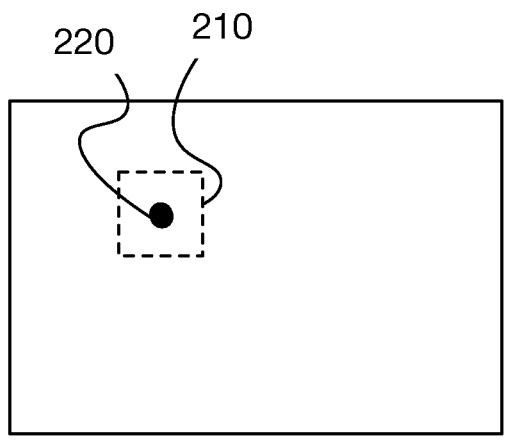
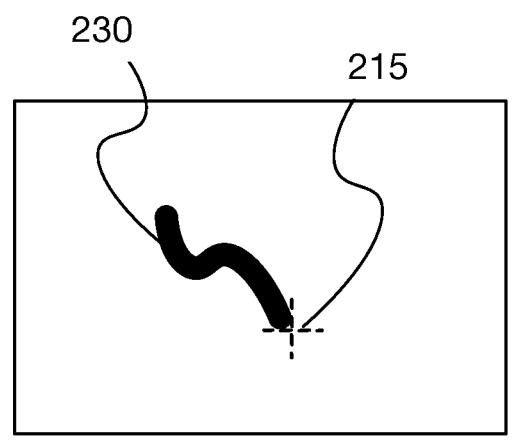
Figure 4c.
Figure 4d.
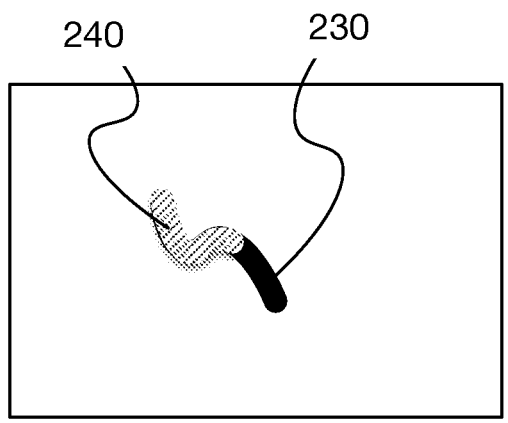
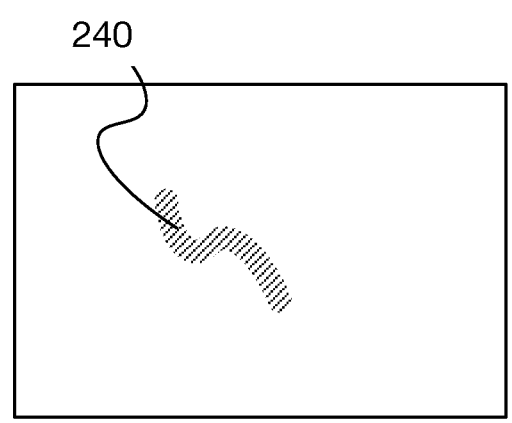
Figure 4e.
Figure 4f.

TOUCH APPARATUS WITH LOW LATENCY INTERACTIONS

The present invention relates to an improved touch experience on touch surfaces of touch-sensitive apparatus. In particular, the present invention relates to providing low latency touch interactions for interactions with high latency systems.

Touch-sensitive systems ("touch systems") are in widespread use in a variety of applications. Typically, the touch systems are configured to detect a touching object such as a finger or stylus, either in direct contact, or through proximity (i.e. without contact), with a touch surface. Touch systems may be used as touch pads in laptop computers, equipment control panels, and as overlays on displays e.g. hand held devices, such as mobile telephones. A touch panel that is overlaid on or integrated in a display is also denoted a "touch screen". Many other applications are known in the art.

There are numerous known techniques for providing touch sensitivity, e.g. by incorporating resistive wire grids, capacitive sensors, strain gauges, etc. into a touch panel. There are also various types of optical touch systems, which e.g. detect attenuation of emitted light by touch objects on or proximal to a touch surface.

One specific type of optical touch system uses projection measurements of light that propagates on a plurality of propagation paths inside a light transmissive panel. The projection measurements thus quantify a property, e.g. power, of the light on the individual propagation paths, when the light has passed the panel. For touch detection, the projection measurements may be processed by simple triangulation, or by more advanced image reconstruction techniques that generate a two-dimensional distribution of disturbances on the touch surface, i.e. an "image" of everything on the touch surface that affects the measured property. The light propagates by total internal reflection (TIR) inside the panel such that a touching object causes the propagating light on one or more propagation paths to be attenuated by so-called frustrated total internal reflection (FTIR). Hence, this type of system is an FTIR-based projection-type touch system. Examples of such touch systems are found in U.S. Pat. Nos. 3,673,327, 4,254,333, 6,972,753, US2004/0252091, US2006/0114237, US2007/0075648, WO2009/048365, US2009/0153519, US2017/0344185, WO2010/006882, WO20 10/064983, and WO2010/134865.

Another category of touch sensitive apparatus is known as projected capacitive ("p-cap"). A set of electrodes are spatially separated in two layers usually arranged in rows and columns. A controller scans and measures the capacitance at each row and column electrode intersection. The intersection of each row and column produces a unique touch-coordinate pair and the controller measures each intersection individually. An object that touches the touch surface will modify the capacitance at a row and column electrode intersection. The controller detects the change in capacitance to determine the location of the object touching the screen.

In another category of touch-sensitive apparatus known as 'above surface optical touch systems', a set of optical emitters are arranged around the periphery of a touch surface to emit light that travels above the touch surface. A set of light detectors are also arranged around the periphery of the touch surface to receive light from the set of emitters from above the touch surface. An object that touches the touch surface will attenuate the light on one or more propagation paths of the light and cause a change in the light received by one or more of the detectors. The location (coordinates), shape or area of the object may be determined by analysing the received light at the detectors. Examples of such touch systems are found in e.g. PCT/SE2017/051233 and PCT/EP2018/052757.

When using a touch-sensing apparatus to interact with a system that is remote from the touch-sensing apparatus, significant latency can be introduced. For example, interacting with a remotely shared desktop on a remote system using a local touch sensitive display can result in significant latency between the physical interaction on the local touch sensitive display and the visual indication of the interaction. This may be due to the significant round trip time for: the local touch sensitive display to encode and transmit the interaction to the remote system, the remote system to process the interaction and update the output of the remote system (e.g. the shared desktop), and for the updated output of the remote system to be transmitted back to the local touch sensitive display. Latency of greater than 50 ms is not unexpected and can provide a disruptive and unsatisfying experience to a user attempting to interact with the local touch sensitive display. For certain types of interaction, such as writing or drawing using a pen, latency sensitivity is even higher, and latency greater than 50 ms can make the experience ineffective.

Various known techniques have been adopted to reduce touch system latency in a local system. For example, a touch-sensitive apparatus can be configured to increase the scan rate of the touch-sensing apparatus or to use faster processors to carry out the touch decoding faster or the touch signal post processing in a shorter time. Host control devices can be configured so that the operating system does not introduce delays in transmitting signal input to application software. The operating systems can be further configured to avoid buffering. However, these solutions cannot be used for reducing round trip latency of sending an interaction data to a remote system and receiving and displaying the resulting interaction on the local system.

Embodiments of the present invention aim to address the aforementioned problems.

According to an aspect of the present description, there is provided an interactive device configured to: display an output of a remote device, wherein an output delay exists between the output being generated by the remote device and the output being displayed on the interactive device, generate an interaction data in dependence on an interaction with the interactive device at a location, transmit the interaction data to the remote device, display an updated output of the remote device, the updated output being generated by the remote device subsequent to receiving the interaction data, wherein the interactive device being further configured to: generate an interaction image of an area of the updated output of the remote device corresponding to the location of the interaction, determine an interaction indication in dependence on the interaction image, displaying an interaction indication on the interactive device at a location of one or more further interactions with the interactive device. The interactive device may comprise a touch surface and the interaction comprises a touch interaction at a location on the touch surface. The interactive device may comprise a device display configured to display the output of a remote device. The interactive device may comprise a touch display and the interaction comprises a touch interaction at a location on the touch display. The interactive device may be connected to the remote device over a network. The output delay may be equal to or greater than 50 ms. The present aspect may be particularly advantageous where the output delay is equal to or greater than 100 ms. The output of the remote device may be a streamed video of an interactive software. The interaction data transmitted to the remote device is used to update an interactive software on the remote device. The interaction image may comprise a set of pixels corresponding to pixels of the updated output within a radius of the location of the interaction.

Optionally, the determination of the interaction indication further comprises: generating a pre-interaction image of an area of the output of the remote device corresponding to the location of the interaction, generating an interaction image of an area of the updated output of the remote device corresponding to the location of the interaction, determining an interaction indication in dependence on the pre-interaction image and interaction image. The pre-interaction image may comprise a set of pixels corresponding to pixels of the output of the remote device within a radius of the location of the interaction. The interaction indication may be generated in dependence on a difference between the pre-interaction image and the interaction image. Displaying an interaction indication on the interactive device at a location of one or more further interactions may comprise displaying the interaction indication on the interactive device at a position corresponding to the one or more further interactions before the corresponding interactions are displayed in the updated output. A transmission delay may exist between the interaction data being transmitted by the interactice device and received by the remote device, and wherein the output being displayed on the interactive device further comprising only displaying the interaction indication on the interactive device at a location of one or more further interactions for a period corresponding to the output delay and the transmission delay.

According to another aspect of the present description, there is provided a method for interaction between an interactive device and a remote device comprising: displaying an output of a remote device on the interactive device, wherein an output delay exists between an output being generated by the remote device and the output being displayed on the interactive device, generating an interaction data in dependence on an interaction with the interactive device at a location, transmitting the interaction data to the remote device, displaying an updated output of the remote device, the updated output being generated by the remote device subsequent to receiving the interaction data, wherein the method further comprising the steps of: generating an interaction image of an area of the updated output of the remote device corresponding to the location of the interaction, determining an interaction indication in dependence on the interaction image, displaying an interaction indication on the interactive device at a location of one or more further interactions with the interactive device.

FIG. 4 shows a time sequence of an embodiment of the disclosure.

Figure 1A:
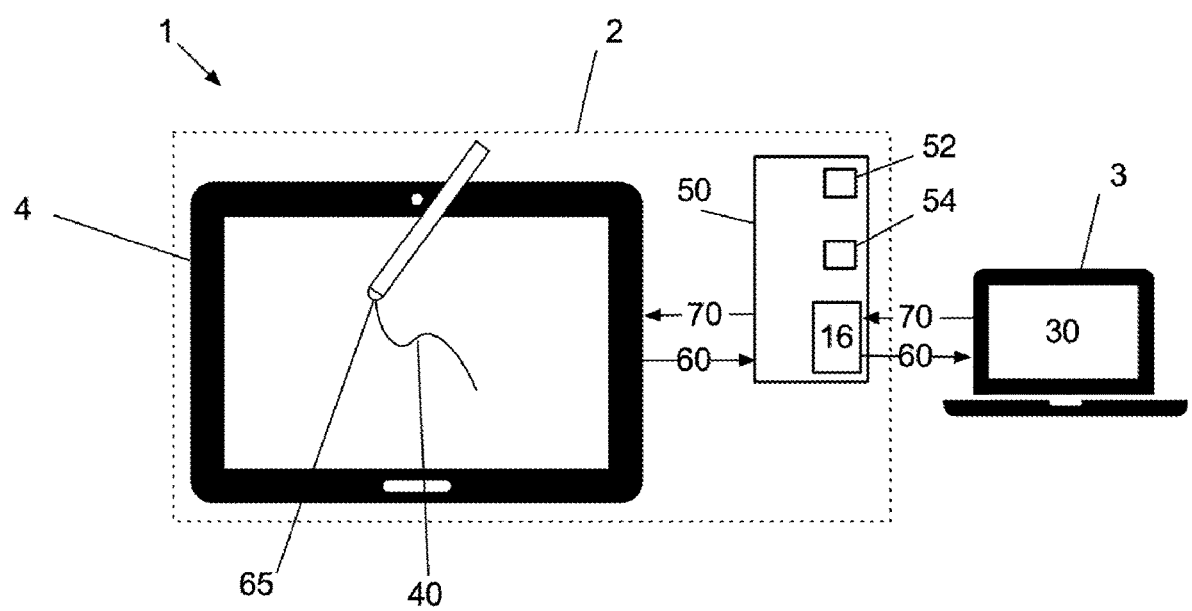
FIG. 1a shows a system drawing of an embodiment of the disclosure.

Various other aspects and further embodiments are also described in the following detailed description and in the attached claims with reference to the accompanying drawings, in which:

FIG. 1a is an example configuration of an interaction system 1 comprising a processing device 50 for providing an interface between an interactive device 2 and an remote device 3. In this example, interactive device 2 is integrated with the processing device 50. The processing device 50 comprises a processor 52, a memory 54, and interface 16. Processing device 50 is configured to execute a software stored in memory 54 and display to touch display 4 an output 70 as video data. Processing device 50 is further configured to receive interaction data 60 (e.g. touch co-ordinate data) from touch display 4 wherein interaction data 60 corresponds to touch interactions occurring on the touch surface of touch display 4. In one embodiment, the software running on processor 52 is a software 88 configured to receive and process interaction data 60 and transmit interaction data 60 to remote device 3 via interface 16. Software 88 may also be configured to receive remote device output 70 via interface 16 and display output 70 on touch display 4.

The output 70 of the remote device 3 may be a streamed video of a remote interactive software 98. The interaction data 60 is used to update an interactive software 98 on the remote device 3. The interaction data 60 transmitted to the remote device 3 need not be touch coordinates. In some embodiments, the interaction data 60 may comprise a mouse position or any other former of two-dimensional or three-dimensional spatial control data, such as a VR controller or joystick control. In an example where the interaction data 60 is touch coordinate data, a user can interact with remote device 3 via interactive device 2 and touch display 4. For example, when showing a presentation from the remote device 3 on the interactive device 2, the user can interact with remote device 3 using touch display 4.

The interactive device 2 may be connected to the remote device 3 over a network using interface 16. In this embodiment, interface 16 may comprise a Ethernet, Wi-Fi, Fibre Channel or equivalent network interface. The network between interactive device 2 and remote device 3 may comprise a local area network (LAN), the internet, or equivalent, and may introduce transmission latency. Similarly, other aspects of the interactive device 2 and remote device 3 may introduce latency of the interaction experience, such as video encoding time and other processing tasks.

In one embodiment in which an interaction 99 occurs at a location 93 on the touch display 4 and the corresponding interaction data 60 is transmitted to remote device 3, an interaction indication may be displayed on touch display 4 at the location 93 of the interaction 99 before the updated output 70b of remote device 3 is received at interactive device 2. This allows a user of interactive device 2 to see immediate feedback from their interaction 99 before the remote device 3 has been able to process the interaction and send back the updated output 70b. An example of such an interaction indication may be a cursor at the location 93 of the interaction 99 or a trail that follows the location of the interaction for a period of time. One disadvantage of this approach is that the interaction indication will not necessarily visually match the results of the interaction on remote device 3. Therefore, although the user can see a low latency indication of the interaction location, they will be unable to obtain an accurate indication of the actual output of the interaction. They will only be able to see the true results of the interaction once the updated output from remote device 3 is received and shown in touch display 4.

An embodiment of the description provides a solution to the above problem. In order to generate a visually more accurate predictive interaction indication 230, an embodiment provides a technique for imaging the true interaction from remote device 3 and generating a predictive interaction indicator 230 for indicating further interactions 215 to the user with low latency.

Figure 1B:
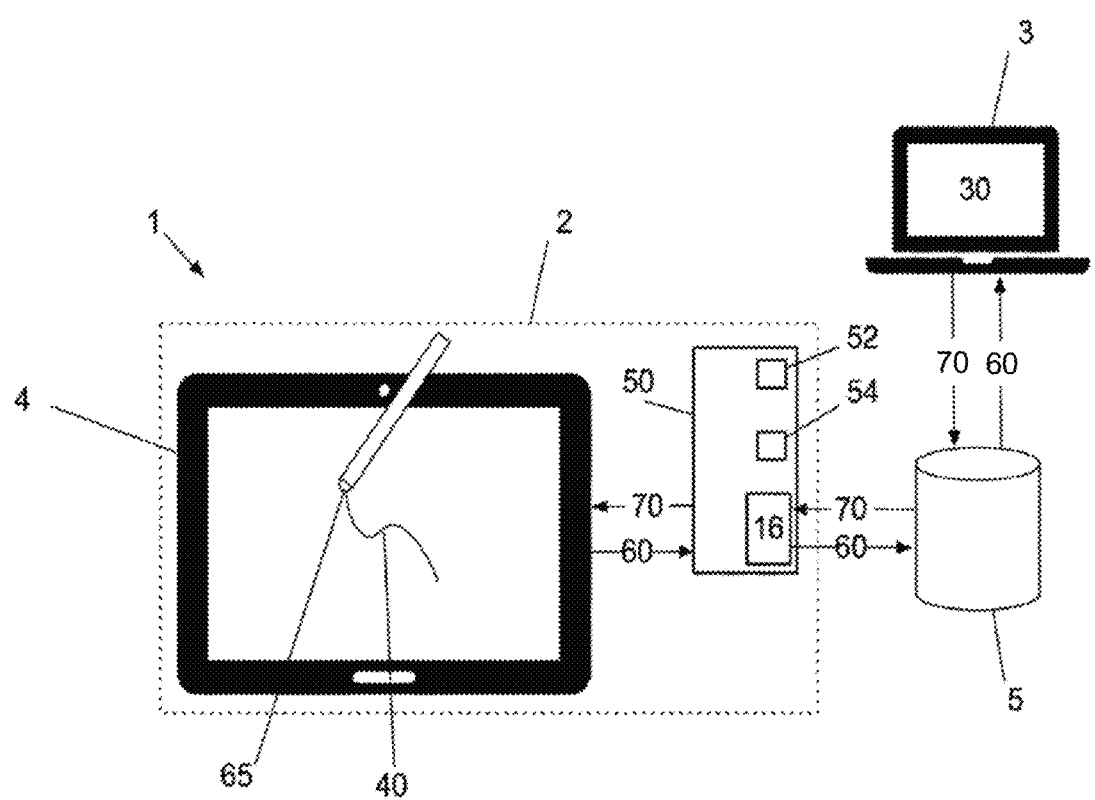
FIG. 1b shows a system drawing of another embodiment of the disclosure.
Figure 1C:
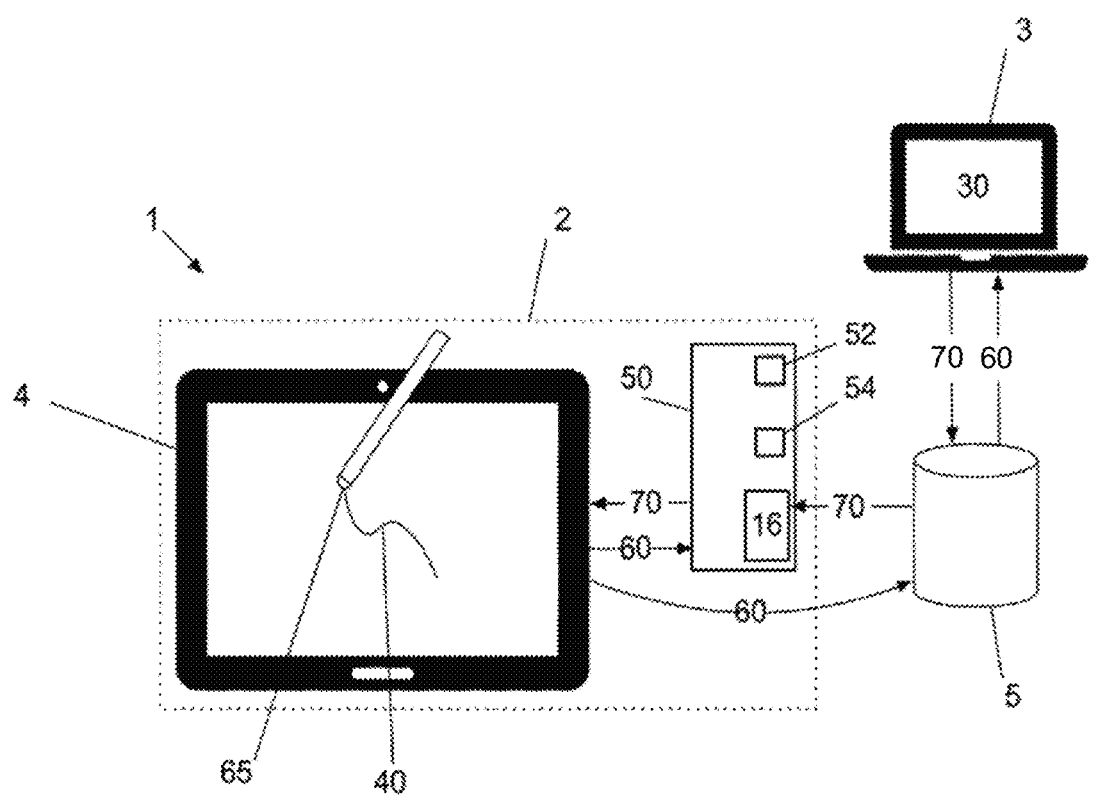
FIG. 1c shows a system drawing of another embodiment of the disclosure.

FIG. 1b is another configuration of interaction system 1 comprising networked device 5 connected to interactive device 2 and remote device 3. In this example, interface 16 may be connected to networked device 5 via at least one of an ethernet connection, a Wi-Fi connect, USB, Thunderbolt, or equivalent for transmitting interaction data 60 and HDMI, Thunderbolt, USB-C, or equivalent, for transmitting remote device output 70. Networked device 5 may then be connected to remote device 3 via a Local Area Network, the Internet, or equivalent. In one embodiment, interactive device 2 is configured to operate Android™ operating system or equivalent on processing device 50 and the software 88 is an Android™ application or equivalent configured to receive and process interaction data 60 and transmit interaction data 60 to Networked device 5 via interface 16. Networked device 5 may then transmit interaction data 60 to remote device 3. Networked device 5 may then receive remote device output 70 from remote device 3 and transmit remote device output 70 to interactive device 2 for processing by software 88. Remote device 3 may connect to networked device 5 by means of a Miracast standard or equivalent. In an embodiment shown in FIG. 1c, touch data is simultaneously transmitted from touch display 4 to processing device 50 and networked device 5.

Figure 2:
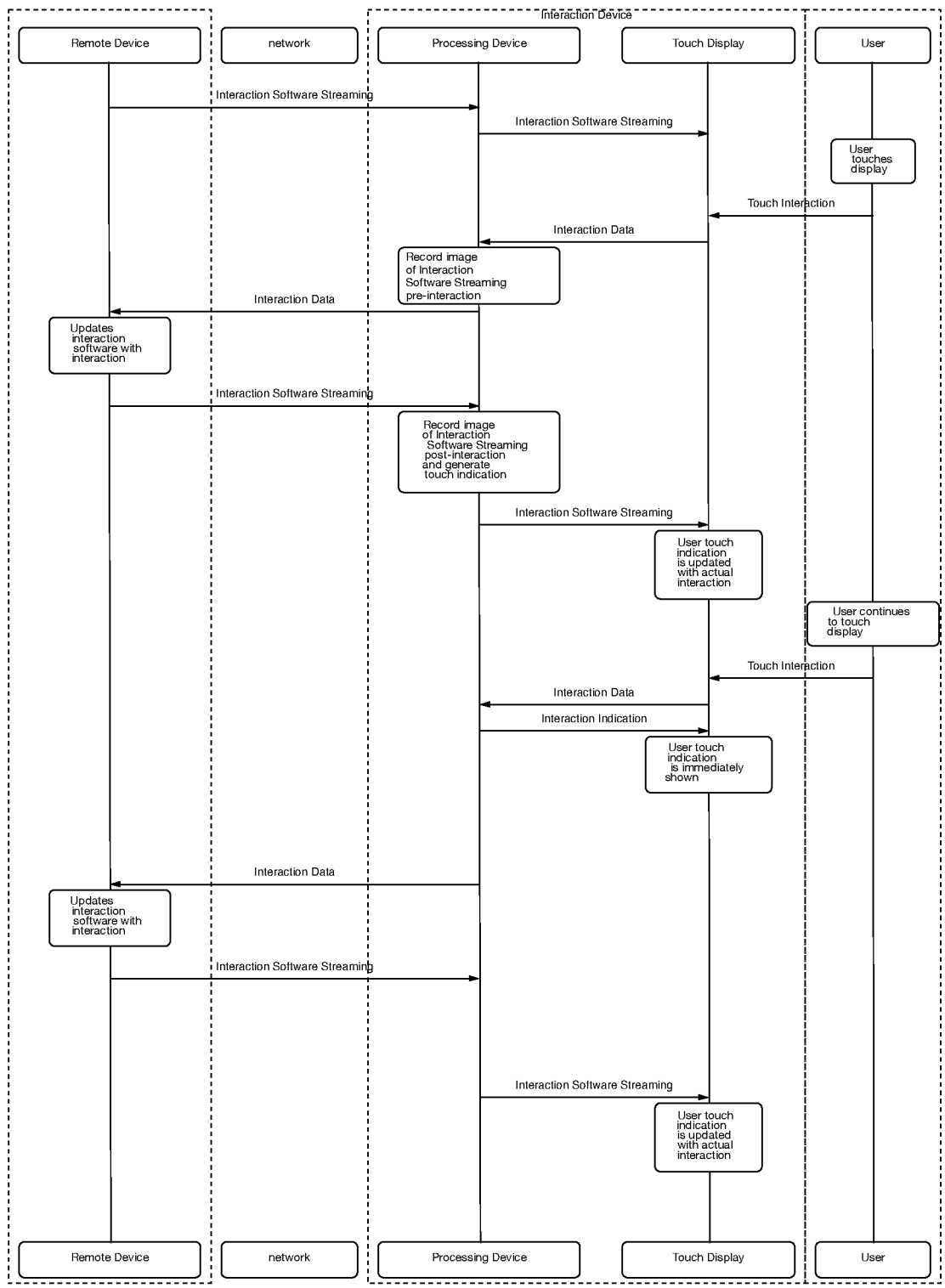
FIG. 2 shows a sequence diagram of an embodiment of the disclosure.

FIG. 2 shows an example of the embodiment of FIG. 1a. The sequence diagram of the FIG. 2 describes the following sequence:

Remote device 3 transmits a streaming video of an interaction software 98 running on remote device 3. The streaming video is transmitted via a network to interaction device 2, wherein it is received at processing device 50 and displayed on touch display 4.

A user interacts with touch display 4 to indicate an intended interaction with the interaction software 98 running on remote device 3. The touch interaction 94 is detected at touch display 4 and processed by processing device 50 as touch interaction data 60 before being transmitted (with a likely delay) to remote device 3 over the network.

In an optional step, at a time before, approximately in parallel, or within a period less than the interaction latency of the present system (i.e. the delay in sending interactions to remote device 3 and receiving the resulting update from remote device 3) of the above step, the processing device 50 images an area 210 of the streaming video corresponding to the location 93 of the touch interaction 94.

The remote device 3 receives the touch interaction data 60 and updates the interaction software 98 using the touch interaction data 60. The remote device 3 then transmits the updated output 70b of the interaction software 98 back to interaction device 2 via the network with a delay.

The updated output 70b of the interaction software 98 is received by processing device 50. Processing device 50 images an area 210 of the updated output 70b of the interaction software 98 corresponding to the location 93 of the touch interaction 94.

The updated output 70b of the interaction software 98 is displayed on touch display 4.

The processing device 50 generates a predictive interaction indication 230 in dependence on the image of the area 210 of the updated output 70b of the interaction software 98 and, optionally also on the image of the area 210 of the streaming video before the update. The predictive interaction indication 230 may be a particular brush shape, cursor type, colour, object selection visualisation, or objects dragging or resizing visualisation, as well as any other type of interaction indication that can be rendered.

The user further interacts with touch display 4 to indicate a further intended interaction with the interaction software 98 running on remote device 3. The touch interaction is detected at touch display 4 and processed by processing device 50 as touch interaction data.

The touch interaction data is transmitted to remote device 3 over the network.

At a time before, approximately in parallel, or within a period less than the interaction latency of the present system of the above step, interaction device 2 displays the generated predictive interaction indication 230 at a location corresponding to the further interaction 215. This appears as a low latency interaction to the user.

The remote device 3 receives the further touch interaction data and updates the interaction software using the touch interaction data. The remote device 3 then transmits the further updated output of the interaction software back to interaction device 2 via the network.

The updated output of the interaction software is received by processing device 50 and displayed on touch display 4, replacing the predictive interaction indication 230 at the same location.

Figure 3:
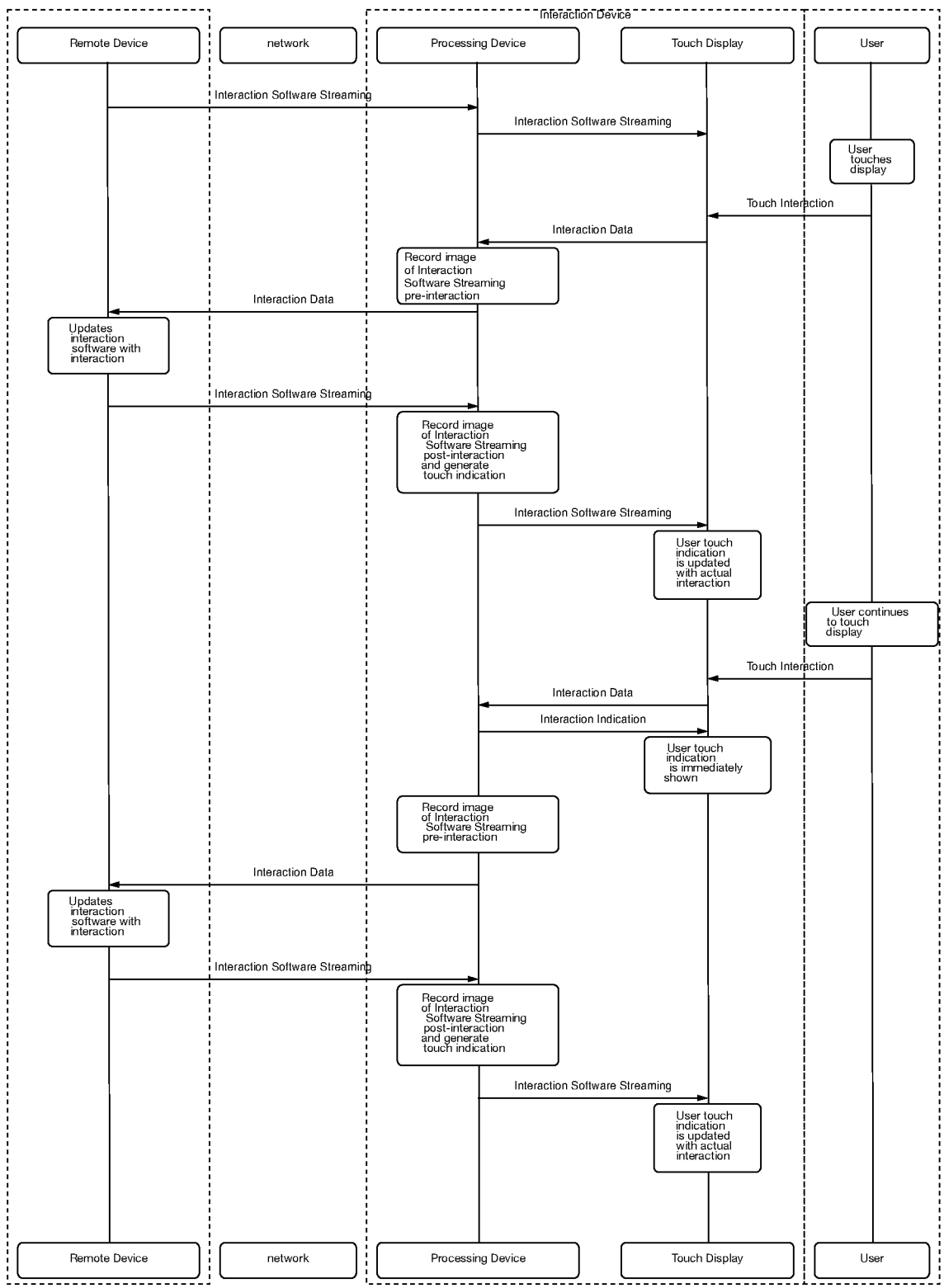
FIG. 3 shows a sequence diagram of another embodiment of the disclosure.

FIG. 3 shows a further example with a different approach to updating the predictive interaction indicator 230. In the example of FIG. 2, the predictive interaction indicator 230 is generated at the start of an interaction and remains the same throughout the interaction. In the example of FIG. 3, the interaction indicator is continually updated throughout the interaction to match the true interaction occurring on the interaction software. This may be advantageous where the interaction is more dynamic, rather than a fixed colour, brush shape, or cursor shape.

In one embodiment, area 210 may be the entire application window in which the interaction occurs. For example, if the user interacts within a word processing application window, the processing device 50 may identify the word processing application based on an image of the entire application window and determine a suitable low latency predictive interaction indicator 230 for use with the word processing application until the true interaction is received from remote device 3. E.g. a particular cursor may be used corresponding to the cursor normally used by the word processing application. In one embodiment, area 210 may be the entire display of output 70. The processing device 50 may then determine a suitable low latency predictive interaction indicator 230 in dependence on the context provided by the entire display of output 70.

FIG. 4 shows a further example with more details on the process of generating an interaction indicator.

As shown in FIG. 4a, the user interacts with touch display 4 to indicate an intended interaction with the interaction software 98 running on remote device 3. The touch interaction 94 is detected at touch display 4 at interaction location 200 and transmitted to remote device 3 over the network.

At a time before, approximately in parallel, or within a period less than the interaction latency of the present system of the above step, the processing device 50 images an area 210 of the streaming video corresponding to the interaction location 200 of the touch interaction 94 to form an interaction image 97. The interaction image 97 may comprise a set of pixels 211 corresponding to pixels within a radius of the location 93 of the touch interaction 94. The set of pixels 211 may be a circle with the centre corresponding to the position of the interaction location 200. In this example, the radius of the circle may be between 1 and 30 pixels, but larger sizes circles may also be envisaged. Alternatively, as shown in FIG. 4b, the set of pixels 211 may be a square with the centre corresponding to the interaction location 200. Other shapes may also be envisaged.

As shown in FIG. 4c, the updated output 70b of the remote interaction software 98 is displayed on touch display 4 a period of time after the events of FIG. 4a, showing the resulting interaction visualisation 220 of the user's interaction. The processing device 50 images an area 210 of the updated output 70b corresponding to the interaction location 200 of the touch interaction 94 to form an updated interaction image 97b. The size and shape of updated interaction image 97b may substantially correspond to the interaction image 97. For example, the set of pixels 211 may be a circle with the centre corresponding to the position of the interaction location 200. Alternatively, the set of pixels 211 may be a square with the centre corresponding to the position of the interaction location 200. Other shapes may also be envisaged.

The processing device 50 then generates a predictive interaction indication 230 for touch interaction 94 in dependence on the interaction image 97 and the updated interaction image 97b. In one embodiment, a difference is determined between the interaction image 97 and the updated interaction image 97b. The difference is indicative of the change in the pixels at the interaction location 200 of the interaction from before the interaction and after the interaction. The change in the pixels will show the interaction on the interaction software 98 resulting from touch interaction 94 and may be a good visual indicator for the low latency predictive interaction indicator 230. For example, after a touch interaction 94 occurs, a green dot may appear at the touch interaction location. It may be useful to assume that future interactions will also result in a green dot, and so the low latency predictive interaction indicator 230 can be set to a green dot, in order to provide a realistic but low latency local indication of the interaction with remote device 3. In one example embodiment, predictive interaction indication 230 may comprise a bitmap of all changed pixels between interaction image 97 and the updated interaction image 97b, with any unchanged pixels set to transparent or equivalent. In the previous example, this bitmap may comprise an area of green pixels surrounded by transparent pixels.

As shown in FIG. 4d, the user further interacts with touch display 4 and the touch interaction data is transmitted to remote device 3 over the network. At the same time, the predictive interaction indication 230 (e.g. the green dot of the earlier example) is displayed on touch display 4 at a location corresponding to the further interactions 215. This appears as a low latency interaction to the user.

As shown in FIG. 4e, the remote device 3 receives the further touch interaction data and updates the interaction software using the touch interaction data. The remote device 3 then transmits the further updated output of the interaction software 98 back to interaction device 2 via the network. As the updated output of the remote interaction software 98 is received by processing device 50 and displayed on touch display 4, interaction outcome 240 as processed by remote device 3 will be displayed on touch display 4 at their corresponding positions. The predictive interaction indications 230 at these positions becomes redundant and may be removed.

As shown in FIG. 4f, eventually the earlier interaction outcome 240 as processed by remote device 3 will be displayed on touch display 4 will completely replace the predictive interaction indications 230 on touch display 4.

In one embodiment, instead of determining predictive interaction indication 230 based on a comparison of pixels between the interaction image 97 and the updated interaction image 97b, predictive interaction indication 230 may instead be based on a predictive interaction indication 230 or interaction outcome 240 for a previous interaction. A previous interaction may be an interaction occurring on touch display 4 that is non-continuous with the new interaction, i.e., the user stopped interacting with touch display 4 before the new interaction began. In one embodiment, a predictive interaction indication 230 for a new interaction is set to the interaction outcome 240 of a previous interaction. Where the system is attempting to generate an accurate predictive interaction indication 230 for a new interaction, a good predictor of the interaction outcome 240 for the new interaction may be the interaction outcome 240 of a previous interaction that occurred within a period of time of the new interaction and/or in the vicinity of the new interaction. In one embodiment, a predictive interaction indication 230 for a new interaction may be set to the interaction outcome 240 of a previous interaction that occurred within the last 4000 ms, or more preferably within the last 1000 ms, of the new interaction. In one embodiment, a predictive interaction indication 230 for a new interaction may be set to the interaction outcome 240 of a previous interaction that occurred within a radius of 5 cm, or more preferably 2 cm, of the new interaction. In one embodiment, a predictive interaction indication 230 for a new interaction may be set to the interaction outcome 240 of a previous interaction that occurred within a radius of 5 cm, or more preferably 2 cm, of the new interaction. In one embodiment, a predictive interaction indication 230 for a new interaction may be set to the interaction outcome 240 of a previous interaction that occurred within a radius of 5 cm, or more preferably 2 cm, of the new interaction and within the last 4000 ms, or more preferably within the last 1000 ms, of the new interaction. In alternative embodiments to the described above, the predictive interaction indication 230 for the previous interaction is used instead of the interaction outcome 240 of the previous interaction. This may be required where interaction outcome 240 was e.g. never determined for the previous interaction.

In one embodiment, predictive interaction indication 230 may be based on a location of a previous interaction. In one example, where a previous interaction occurred at a location corresponding to a colour picking element, predictive interaction indication 230 is configured to match the colour corresponding to the colour picking element.

In one embodiment, a predictive interaction indication 230 is determined in dependence on the presence of a user interface (UI) element positioned under or proximal to the touch interaction 94. The UI element may comprise buttons, scrollbars, menu items, checkboxes, window resize interface, etc. In one embodiment, where a resize interface of a window (e.g. a peripheral edge of an application window) is located proximal to the starting point of touch interaction 94, predictive interaction indication 230 is a window size indicator (e.g. wireframe box or equivalent) showing the expected new size and/or position of the window in response to touch interaction 94. In this embodiment, interaction outcome 240 will show the window being resized with a delay relative to the window size indicator. In one embodiment where interaction outcome 240 shows no change in the window size, the window size indicator is no longer used for predictive interaction indication 230. In one embodiment where the UI element is an UI element with no expected visible interaction outcome 240, predictive interaction indication 230 is not used.

The invention claimed is:

1. An interactive device configured to:
 display an output of a remote device, wherein an output delay exists between the output being generated by the remote device and the output being displayed on the interactive device,
 generate an interaction data in dependence on an interaction with the interactive device at a location,
 transmit the interaction data to the remote device, and
 display an updated output of the remote device, the updated output being generated by the remote device subsequent to receiving the interaction data and in response to the interaction data, wherein the interactive device being further configured to:
 generate an interaction image of an area of the updated output of the remote device corresponding to the location of the interaction,
 determine a predictive interaction indication to display on the interactive device in dependence on the interaction image of the area of the updated output, and
 display the predictive interaction indication on the interactive device at a location of one or more further interactions with the interactive device before the one or more further interactions are received by the remote device and transmitted back to the interactive device by the remote device as updated output for display on the interactive device, wherein the displaying of the predictive interaction indication reduces an appearance of transmission delay between the remote device and the interactive device over a network,
 wherein the predictive interaction indication comprises a brush shape and/or a brush colour, and
 wherein determination of the predictive interaction indication further comprises:
  generating a pre-interaction image of an area of the output of the remote device corresponding to the location of the interaction,
  generating the interaction image of the area of the updated output of the remote device corresponding to the location of the interaction, and
  generating the predictive interaction indication in dependence on a difference between the pre-interaction image and the interaction image.

2. The interactive device of claim 1 wherein the interactive device comprises a touch surface and the interaction comprises a touch interaction at a location on the touch surface.

3. The interactive device of claim 1, wherein the interactive device comprises a device display configured to display the output of a remote device.

4. The interactive device of claim 1, wherein the interactive device comprises a touch display and the interaction comprises a touch interaction at a location on the touch display.

5. The interactive device of claim 1, wherein the interactive device is connected to the remote device over a network.

6. The interactive device of claim 1, wherein the output delay is greater than 50 ms.

7. The interactive device of claim 1, wherein the output of the remote device is a streamed video of an interactive software.

8. The interactive device of claim 1, wherein the interaction data transmitted to the remote device is used to update an interactive software on the remote device.

9. The interactive device of claim 1, wherein the interaction image comprises a set of pixels corresponding to pixels of the updated output within a radius of the location of the interaction.

10. The interactive device of claim 1, wherein the pre-interaction image comprises a set of pixels corresponding to pixels of the output of the remote device within a radius of the location of the interaction.

11. The interactive device of claim 1, wherein displaying a predictive interaction indication on the interactive device at a location of one or more further interactions comprises displaying the predictive interaction indication on the interactive device at a position corresponding to the one or more further interactions before corresponding interactions are displayed in the updated output.

12. The interactive device of claim 1, wherein a transmission delay exists between the interaction data being transmitted by the interactive device and received by the remote device, and wherein the output being displayed on the interactive device further comprising only displaying the predictive interaction indication on the interactive device at a location of one or more further interactions for a period corresponding to the output delay and the transmission delay.

13. The interactive device of claim 1, wherein only displaying predictive interaction indication on the interactive device at the location of the one or more further interactions where the updated output of the remote device does not yet show results of further interactions on interactive device.

14. A method for interaction between an interactive device and a remote device comprising:
 displaying an output of a remote device on the interactive device, wherein an output delay exists between an output being generated by the remote device and the output being displayed on the interactive device,
 generating an interaction data in dependence on an interaction with the interactive device at a location,
 transmitting the interaction data to the remote device,
 displaying an updated output of the remote device, the updated output being generated by the remote device subsequent to receiving the interaction data and in response to the interaction data,
 generating an interaction image of an area of the updated output of the remote device corresponding to the location of the interaction,
 determining a predictive interaction indication to display on the interactive device in dependence on the interaction image corresponding to the remote device, and
 displaying the predictive interaction indication on the interactive device at a location of one or more further interactions with the interactive device before the one or more further interactions are received by the remote device and transmitted back to the interactive device by the remote device as updated output for display on the interactive device, wherein the display of the predictive interaction indication reduces an appearance of transmission delay between the remote device and the interactive device over a network,
 wherein the predictive interaction indication comprises a brush shape and/or a brush colour,
 wherein determination of the predictive interaction indication further comprises:

generating a pre-interaction image of an area of the output of the remote device corresponding to the location of the interaction,
generating the interaction image of the area of the updated output of the remote device corresponding to the location of the interaction, and
generating the predictive interaction indication in dependence on a difference between the pre-interaction image and the interaction image.

* * * * *